US010778398B2

(12) United States Patent
Wang et al.

(10) Patent No.: US 10,778,398 B2
(45) Date of Patent: Sep. 15, 2020

(54) PHYSICAL DOWNLINK CONTROL CHANNEL TRANSMISSION METHOD, AND APPARATUS

(71) Applicant: Huawei Technologies Co., Ltd., Shenzhen, Guangdong (CN)

(72) Inventors: Ting Wang, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 15/922,255

(22) Filed: Mar. 15, 2018

(65) Prior Publication Data

US 2018/0205522 A1 Jul. 19, 2018

Related U.S. Application Data

(63) Continuation of application No. PCT/CN2016/098996, filed on Sep. 14, 2016.

(30) Foreign Application Priority Data

Sep. 17, 2015 (CN) .......................... 2015 1 0595794

(51) Int. Cl.
H04L 5/00 (2006.01)
H04W 72/04 (2009.01)
(52) U.S. Cl.
CPC ......... *H04L 5/0053* (2013.01); *H04W 72/042* (2013.01); *H04L 5/003* (2013.01); *H04L 5/0005* (2013.01); *H04W 72/0446* (2013.01)

(58) Field of Classification Search
CPC ........... H04W 72/042; H04W 72/0406; H04W 72/0446; H04W 72/0453; H04L 5/0053; H04L 5/0005
See application file for complete search history.

(56) References Cited

U.S. PATENT DOCUMENTS 8,873,467 B2 * 10/2014 Dinan ................ H04L 27/2649
370/328
2009/0279500 A1 11/2009 Luo et al.
(Continued)

FOREIGN PATENT DOCUMENTS

CN 101982001 A 2/2011
CN 102299769 A 12/2011
(Continued)

Primary Examiner — Shukri Taha
(74) Attorney, Agent, or Firm — Conley Rose, P.C.

(57) ABSTRACT

A physical downlink control channel transmission method is provided, and the method is used by a wireless network device to send N signal sets, where each signal set is used to transmit control information of one or more terminals, a signal in the signal set includes a PDCCH or a PDCCH and a PCFICH. The method includes: sending, by the wireless network device, each signal set to the terminal on a resource that can be occupied by the signal set, where the wireless network device performs sending processing on each signal set, and the sending processing includes at least one of multiplexing, scrambling, modulation, interleaving, or resource mapping. Interference between signal sets may be canceled, PCFICH and PDCCH transmission reliability may be improved, and the terminal receives the PCFICH and the PDCCH on a resource of a received signal set, to reduce complexity of detecting a signal by the terminal.

20 Claims, 10 Drawing Sheets

(56) References Cited

U.S. PATENT DOCUMENTS

| | | |
|---|---|---|
| 2011/0026449 A1 | 2/2011 | Kuo |
| 2013/0044712 A1 | 2/2013 | Kim et al. |
| 2013/0286960 A1 | 10/2013 | Li et al. |
| 2014/0105155 A1 | 4/2014 | Kim et al. |
| 2014/0133590 A1 | 5/2014 | Ahn et al. |
| 2014/0313994 A1 | 10/2014 | Su et al. |
| 2015/0043511 A1* | 2/2015 | Dinan ................ H04L 27/2649 370/329 |
| 2015/0124671 A1 | 5/2015 | Tabet et al. |
| 2017/0086207 A1* | 3/2017 | Yokomakura ......... H04W 24/10 |

FOREIGN PATENT DOCUMENTS

| | | |
|---|---|---|
| CN | 102340370 A | 2/2012 |
| CN | 102387598 A | 3/2012 |
| CN | 104620551 A | 5/2015 |
| EP | 2847875 A1 | 3/2015 |

\* cited by examiner

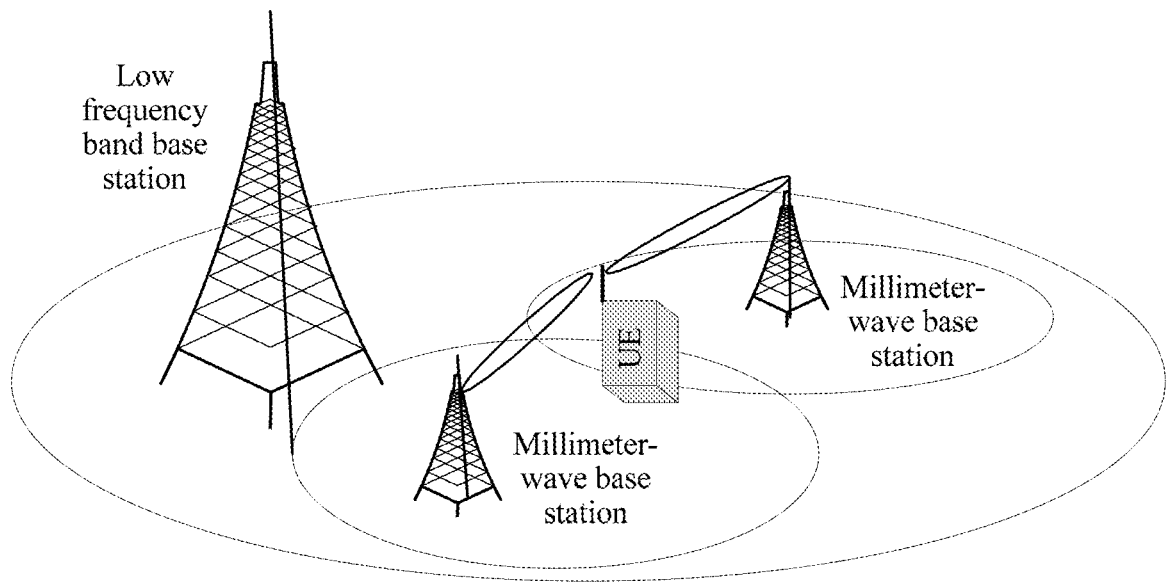

FIG. 1

S101 — A first wireless network device sends each signal set to a second wireless network device on a resource that can be occupied by the signal set, where the first wireless network device performs sending processing on a signal in each signal set, and the sending processing includes at least one of multiplexing, scrambling, modulation, interleaving, or resource mapping

FIG. 2

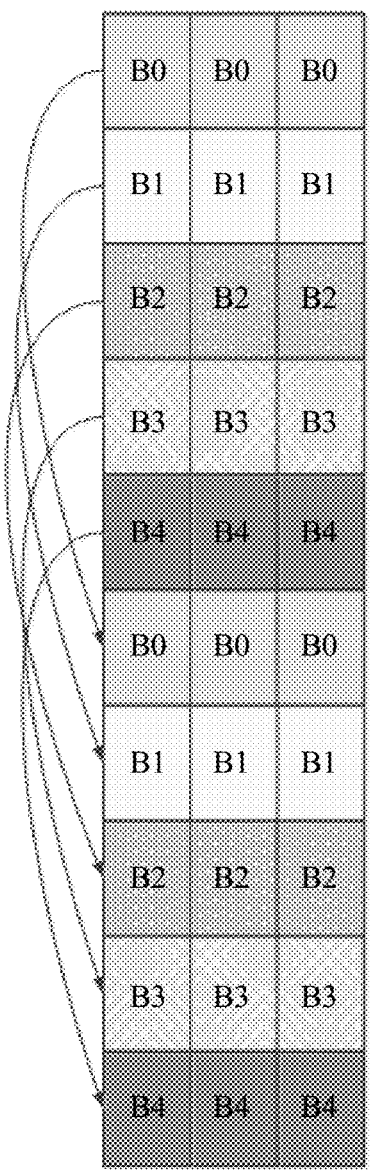
A PDCCH occupies three symbols
FIG. 3-a

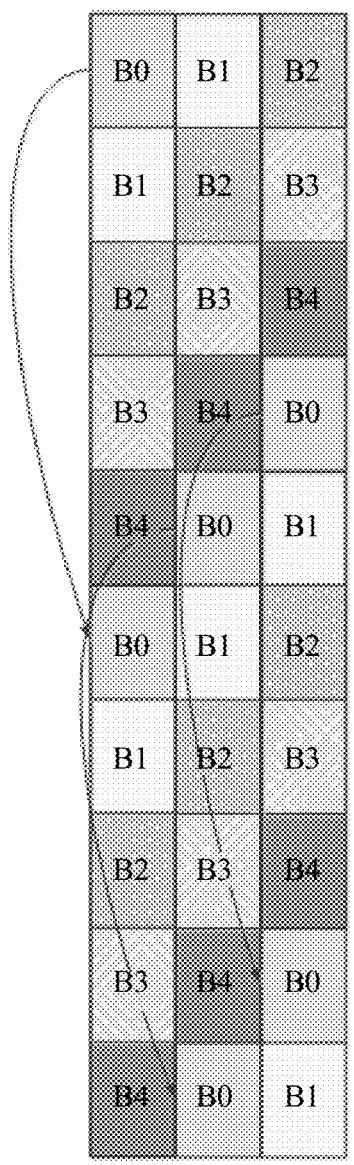
A PDCCH occupies
three symbols
FIG. 3-b

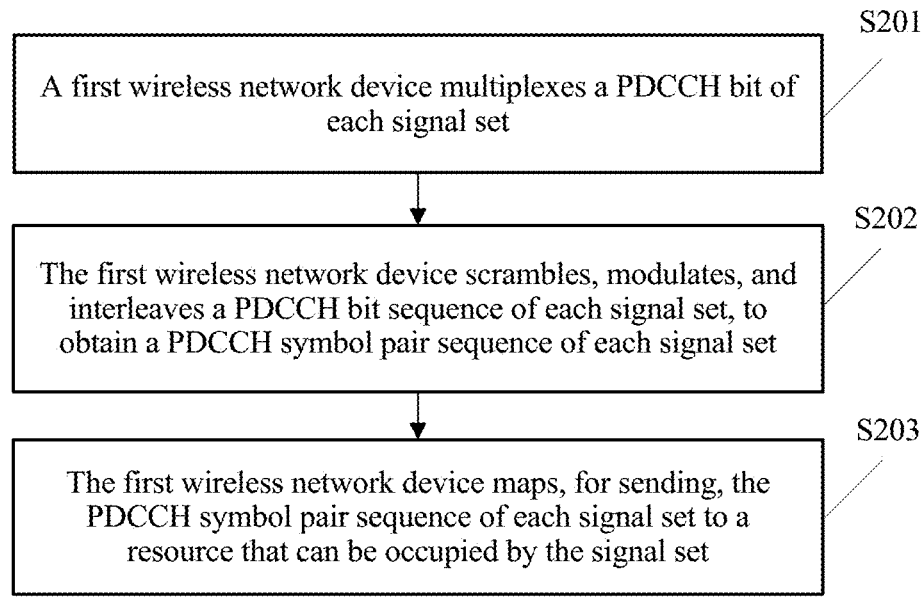
FIG. 4
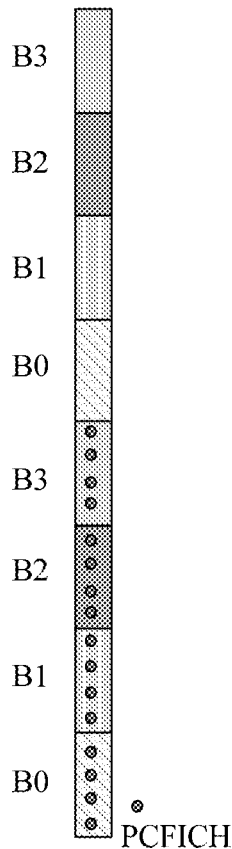
FIG. 5-a

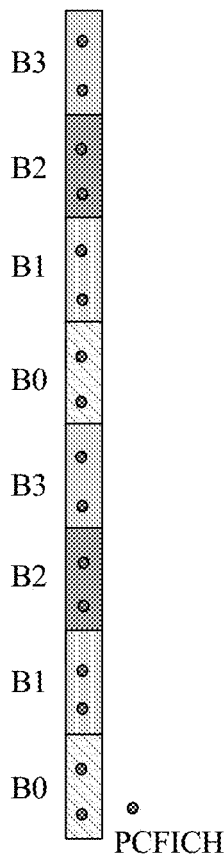

FIG. 5-b

| S401 |
| --- |
| A second wireless network device determines a resource that can be occupied by a received signal set, where a signal in the signal set includes a PDCCH or a PDCCH and a PCFICH, and the resource that can be occupied by the signal set is lower than system bandwidth in a frequency domain |

| S402 |
| --- |
| The second wireless network device receives the signal in the signal set on the resource that can be occupied by the received signal set, so as to obtain control information sent by a first wireless network device, where receiving processing includes at least one of determining search space, de-interleaving, demodulation, or descrambling |

FIG. 6

PHYSICAL DOWNLINK CONTROL CHANNEL TRANSMISSION METHOD, AND APPARATUS

CROSS-REFERENCE TO RELATED APPLICATIONS

This application is a continuation of International Application No. PCT/CN2016/098996, filed on Sep. 14, 2016, which claims priority to International Patent Application No. 201510595794.5, filed on Sep. 17, 2015. The disclosures of the aforementioned applications are hereby incorporated by reference in their entireties.

TECHNICAL FIELD

The present application relates to the field of communications technologies, and specifically, to a physical downlink control channel transmission method, an apparatus, and a system.

BACKGROUND

In a Long Term Evolution (LTE) system, a physical downlink control channel (PDCCH) is used to transmit downlink control information (DCI) to user equipment (UE), for example, an uplink scheduling instruction, a downlink data transmission indication, and common control information. The DCI includes control information, for example, resource allocation, a transmission format, power control, a frequency hopping type, and a transmission mode.

A centimeter wave (centimeter wave) frequency band is usually a frequency spectrum ranging from 3 GHz to 30 GHz, and a millimeter wave frequency band is usually a frequency spectrum ranging from 3 GHz to 300 GHz, which may be collectively referred to as a millimeter wave. With rapid development of packet services and intelligent terminals, a high-speed service with a large data amount requires more frequency spectrums. A millimeter wave has a large quantity of available frequency resources, and therefore will become a potential target frequency spectrum during future development in a $5^{th}$ generation 5G mobile communications system and an LTE-Advanced (LTE-A) system.

A main challenge of using a millimeter wave high frequency band in cellular communication lies in that a relatively large path loss exists in signal transmission on this frequency band. In addition, signal attenuation caused by factors such as signal absorption and scattering performed by air, rain, fog, buildings or other objects is extremely severe. Therefore, during signal transmission on a high frequency band, massive multiple-input multiple-output (Massive MIMO) antennas need to be used to form an extremely high antenna gain, to compensate for a path loss in a signal transmission process. There may be up to a hundred of antennas in a massive MIMO antenna array. This may cause a relatively large antenna gain, and also generate a relatively narrow antenna beam to ensure cell coverage. Currently, in the LTE system, a physical control format indicator channel (PCFICH) and the PDCCH are sent on entire system full bandwidth, and if the PCFICH and the PDCCH are sent on the system full bandwidth by using a massive MIMO technology by using a narrow beam, PCFICH data and PDCCH data transmitted by using different beams overlap each other, so that detection performed by the user equipment (UE) becomes more complex, and implementation of a base station becomes more complex. Currently, there is no technology that can resolve a problem of transmitting the PCFICH and the PDCCH in a scenario of multiple beams.

SUMMARY

Embodiments of the present disclosure provide a physical downlink control channel transmission method, an apparatus, and a system, which are used in a wireless communications system in which transmission is performed by using a narrow beam. In technical solutions disclosed in the embodiments of the present disclosure, interference between signal sets sent by using a narrow beam may be canceled, PCFICH and PDCCH transmission reliability may be improved, and a second wireless network device receives a PCFICH and a PDCCH on a resource of a received signal set, so as to reduce complexity of detecting a signal by the second wireless network device. In addition, as wireless communications requirements develop, there are various network services, for example, a Voice over Internet Protocol (VoIP) service, a high-definition video transmission service, a high-coverage small-data amount machine type communication (MTC) service, a delay-sensitive service, an evolved multimedia broadcast/multicast (eMBMS) service, and a device-to-device (D2D) communication service. To improve carrier utilization, different services are simultaneously transmitted in a same communications system. In an existing LTE system, a PCFICH and a PDCCH sent by occupying system full bandwidth cannot support simultaneous transmission of the foregoing different services. Currently, there is no technology that can resolve a problem of designing the PCFICH and the PDCCH when different services are simultaneously transmitted in the system. In the technical solutions of the present disclosure, a problem of transmitting a PDCCH (or a PDCCH and a PHICH) when different services are transmitted on a same carrier in the communications system may be resolved. Further, different air interface features (for example, an air interface feature may include at least one of a subcarrier spacing or a cyclic prefix CP length) may be further used for services transmitted on a same carrier.

A first aspect of the embodiments of the present disclosure provides a physical downlink control channel transmission method, and the method is used by a first wireless network device to send N signal sets, where each of the N signal sets is used to transmit control information of one or more second wireless network devices, N is an integer greater than 2, a signal in the signal set includes a PDCCH or a PDCCH and a PCFICH, and the method includes:

sending, by the first wireless network device, each signal set to the second wireless network device on a resource that can be occupied by the signal set, where the first wireless network device performs sending processing on a signal in each signal set, and the sending processing includes at least one of multiplexing, scrambling, modulation, interleaving, or resource mapping.

With reference to the first aspect, in a first possible implementation, the sending, by the first wireless network device, each signal set to the second wireless network device on a resource that can be occupied by the signal set further includes:

sending, by the first wireless network device, the PDCCH in the signal set to the second wireless network device by using the resource that can be occupied by the signal set, where a quantity of time domain symbols occupied by the PDCCH in the signal set is a quantity of time domain symbols notified by the first wireless network device to the second wireless network device by using a system broadcast message or a radio resource control (RRC) message, or is a preset quantity of time domain symbols.

With reference to the first aspect, in a second possible implementation, the sending, by the first wireless network device, each signal set to the second wireless network device on a resource that can be occupied by the signal set includes:

sending, by the first wireless network device, the PCFICH in each signal set to the second wireless network device by using a first time domain symbol of the resource that can be occupied by the signal set; and sending, by the first wireless network device, the PDCCH in the signal set to the second wireless network device by using the resource that can be occupied by the signal set, where a quantity of time domain symbols occupied by the PDCCH in the signal set is a quantity of time domain symbols indicated by the PCFICH in the signal set.

With reference to any one of the first aspect, or the first or the second possible implementation of the first aspect, in a third possible implementation, a CCE that can be occupied by each signal set is independently numbered, search space of the signal set at a control channel element (CCE) aggregation level L is defined according to a candidate PDCCH set in the signal set, and the candidate PDCCH set in the signal set is determined according to a CCE number of the signal set; and the CCE search space of the signal set at the CCE aggregation level L is expressed as:

$$L\{(Y_k + m') \bmod \lfloor N_{CCE,k}^{B_j}/L \rfloor\} + i, \text{ where}$$

$i=0, \ldots,$ and $L-1$, $N_{CCE,k}^{B_j}$ is a total quantity of CCEs of a resource that can be occupied by a signal set $j$ in a subframe $k$, the aggregation level $L$ is a positive integer, $m'=m+M^{(L)} \cdot n_{CI}$, and $n_{CI}$ is a value in a carrier indicator field, or if no carrier indicator field is configured, $m'=m$, $m=0, \ldots,$ and $M^{(L)}-1$, and $M^{(L)}$ is a quantity of candidate PDCCHs in the search space at the CCE aggregation level L; and for common search space, $Y_k=0$; and/or, for second wireless network device-specific search space at the aggregation level L, $Y_k$ is defined as: $Y_k=(A) \cdot Y_{k-1}) \bmod D$, A and D are integer coefficients, $Y_{-1}=n_{RNTI} \neq 0$, and $n_{RNTI}$ is a radio network temporary identifier.

With reference to any one of the first aspect, or the first to the third possible implementations, in a fourth possible implementation, that the first wireless network device performs scrambling on the signal in each signal set includes:

scrambling, by the first wireless network device, a PDCCH bit sequence of each signal set, so as to obtain a scrambled bit sequence, where the scrambled bit sequence is expressed as:

$$\tilde{b}(i) = (b(i) + c(i)) \bmod 2, \text{ where}$$

$b(i)$ is the PDCCH bit sequence used before scrambling, a scrambled sequence $c(i)$ is initialized to $$c_{init} = \lfloor n_s/2 \rfloor 2^w + N_{ID}^{cell} \cdot N_{beamsum} + N_{ID}^{beam}, w = \lceil \log_2(N_{ID}^{cell} \cdot N_{beamsum}) \rceil,$$

$n_s$ is a timeslot number, $N_{ID}^{cell}$ is a physical cell identifier, $N_{beamsum}$ is a quantity of signal sets, and $N_{ID}^{beam}$ is an identifier of a signal set.

With reference to any one of the second to the fourth possible implementations of the first aspect, in a fifth possible implementation, the sending, by the first wireless network device, the PCFICH in each signal set to the second wireless network device by using a first time domain symbol of the resource that can be occupied by the signal set includes:

sending, by the first wireless network device, the PCFICH to the second wireless network device by using four resource element groups (REG, Resource Element Group) in the first time domain symbol of the resource that can be occupied by each signal set, where if the REGs are distributed on one frequency sub-band occupied by the signal set, the frequency sub-band includes subcarriers of one or more resource blocks RBs, and subcarrier locations of the REGs are expressed as:

a subcarrier location of a first REG is: $k = k_{start}^{B_i} + \bar{k}$;

a subcarrier location of a second REG is:

$$k = (k_{start}^{B_i} + \bar{k} + \lfloor N_{RB}^{subband}/2 \rfloor \cdot N_{sc}^{RB}/2) \bmod N_{RB}^{subband} N_{sc}^{RB};$$

a subcarrier location of a third REG is:

$$k = (k_{start}^{B_i} + \bar{k} + \lfloor 2N_{RB}^{subband}/2 \rfloor \cdot N_{sc}^{RB}/2) \bmod N_{RB}^{subband} N_{sc}^{RB}; \text{ and}$$

a subcarrier location of a fourth REG is:

$$k = (k_{start}^{B_i} + \bar{k} + \lfloor 3N_{RB}^{subband}/2 \rfloor \cdot N_{sc}^{RB}/2) \bmod N_{RB}^{subband} N_{sc}^{RB}, \text{ where}$$

$\bar{k} = (N_{sc}^{RB}/2) \cdot (N_{ID}^{cell} \bmod 2N_{RB}^{subband})$, $N_{ID}^{cell}$ is a physical cell, identifier, $k_{start}^{B_i}$ is a start subcarrier location offset of a PCFICH in a signal set i, $N_{RB}^{subband}$ is a quantity of resource blocks RBs included in the frequency sub-band, and $N_{sc}^{RB}$ is a quantity of subcarriers included in one RB.

With reference to any one of the first aspect, or the first to the fifth possible implementations, in a sixth possible implementation, before the sending, by the first wireless network device, each signal set to the second wireless network device on a resource that can be occupied by the signal set, the method further includes:

sending, by the first wireless network device, a size of a frequency sub-band and a total quantity of signal sets or a total quantity of frequency sub-bands and a total quantity of signal sets to the second wireless network device, where the size of the frequency sub-band and the total quantity of signal sets or the total quantity of frequency sub-bands and the total quantity of signal sets are used by the second wireless network device to calculate, according to a predefined resource allocation algorithm, a resource that can be occupied by a received signal set, and the frequency sub-band includes subcarriers of one or more RBs in a frequency domain; or sending, by the first wireless network device, a CRS, where a resource location of the CRS or a sequence of the CRS is used by the second wireless network device to determine a resource that can be occupied by a received signal set; or notifying, by the first wireless network device by sending the PCFICH, the second wireless network device of a resource that can be occupied by a received signal set; or notifying, by the first wireless network device by sending an RRC message, the second wireless network device of a resource that can be occupied by a received signal set.

A second aspect of the embodiments of the present disclosure provides a physical downlink control channel transmission method, and the method is used by a second wireless network device to obtain control information from a first wireless network device, where the control information includes common control information and/or dedicated control information, and the method includes:

determining, by the second wireless network device, a resource that can be occupied by a received signal set, where a signal in the signal set includes a PDCCH or a PDCCH and a PCFICH, and the resource that can be occupied by the signal set is lower than system bandwidth in a frequency domain; and receiving, by the second wireless network device, the signal in the signal set on the resource that can be occupied by the received signal set, so as to obtain the control information sent by the first wireless network device, where processing of the receiving includes at least one of determining search space, de-interleaving, demodulation, or descrambling.

With reference to the second aspect, in a first possible implementation, the receiving, by the second wireless network device, the signal in the signal set on the resource that can be occupied by the received signal set, so as to obtain the control information sent by the first wireless network device includes:

receiving, by the second wireless network device, the PDCCH in the signal set on the resource that can be occupied by the received signal set, so as to obtain the control information sent by the first wireless network device, where a quantity of time domain symbols occupied by the PDCCH in the received signal set is a quantity that is of time domain symbols occupied by the signal set and that is indicated in a system broadcast message or an RRC message sent by the first wireless network device, or is a preset quantity of time domain symbols.

With reference to the second aspect, in a second possible implementation, the receiving, by the second wireless network device, the signal in the signal set on the resource that can be occupied by the received signal set, so as to obtain the control information from the first wireless network device further includes:

receiving, by the second wireless network device, the PCFICH in the signal set on a first time domain symbol of the resource that can be occupied by the received signal set; and receiving, by the second wireless network device, the PDCCH in the signal set on the resource that can be occupied by the received signal set, so as to obtain the control information sent by the first wireless network device, where a quantity of time domain symbols occupied by the PDCCH in the received signal set is a quantity of time domain symbols indicated by the PCFICH in the signal set.

With reference to any one of the second aspect to the second possible implementation of the second aspect, in a third possible implementation, the determining, by the second wireless network device, a resource that can be occupied by a received signal set includes:

calculating, by the second wireless network device according to a size of a frequency sub-band and a total quantity of signal sets or according to a total quantity of frequency sub-bands and a total quantity of signal sets by using a predefined resource allocation algorithm, the resource that can be occupied by the received signal set, where the frequency sub-band includes subcarriers of one or more RBs in the frequency domain, and the size of the frequency sub-band and the total quantity of signal sets or the total quantity of frequency sub-bands and the total quantity of signal sets are obtained from the system broadcast message or the RRC message sent by the first wireless network device; or determining, by the second wireless network device by detecting the PCFICH in the received signal set sent by the first wireless network device, the resource that can be occupied by the received signal set; or detecting, by the second wireless network device, a cell-specific reference signal CRS sent by the first wireless network device, and determining, according to a resource location of the CRS or a sequence of the CRS, the resource that can be occupied by the received signal set; or determining, by the second wireless network device by receiving the broadcast message or the RRC message sent by the first wireless network device, the resource that can be occupied by the received signal set.

A third aspect of the embodiments of the present disclosure provides a wireless network device, configured to send N signal sets, where each of the N signal sets is used to transmit control information of one or more second wireless network devices, N is an integer greater than 2, the signal set includes a PDCCH or a PDCCH and a PCFICH, and the device includes a sending unit, where the sending unit is configured to send each signal set to the second wireless network device on a resource that can be occupied by the signal set, where the sending unit performs sending processing on a signal in each signal set, and the sending processing includes at least one of multiplexing, scrambling, modulation, interleaving, or resource mapping.

A fourth aspect of the embodiments of the present disclosure provides a wireless network device, configured to obtain control information from a first wireless network device, where the control information includes common control information and/or dedicated control information, and the device includes a processing unit and a receiving unit, where the processing unit is configured to determine a resource that can be occupied by a received signal set, where the signal set includes a PDCCH or a PDCCH and a PCFICH, and the resource that can be occupied is lower than system bandwidth in a frequency domain; and the receiving unit is configured to receive a signal in the signal set on the resource that can be occupied by the received signal set, so as to obtain the control information sent by the first wireless network device, where processing of the receiving includes at least one of determining search space, de-interleaving, demodulation, or descrambling.

A fifth aspect of the embodiments of the present disclosure provides a wireless network device, including a processor, a memory, and a transceiver, where the memory is configured to store an instruction, the processor is configured to execute the instruction stored in the memory, so as to control the transceiver to receive and send a signal, and when the processor executes the instruction stored in the memory, the wireless network device is configured to complete the method according to any one of the first aspect to the sixth possible implementation of the first aspect provided in the embodiments of the present disclosure.

A sixth aspect of the embodiments of the present disclosure provides a wireless network device, including a processor, a memory, and a transceiver, where the memory is configured to store an instruction, the processor is configured to execute the instruction stored in the memory, so as to control the transceiver to receive and send a signal, and when the processor executes the instruction stored in the memory, the wireless network device is configured to complete the method according to any one of the second aspect to the third possible implementation of the second aspect provided in the embodiments of the present disclosure.

In the technical solutions disclosed in the embodiments of the present disclosure, the first wireless network device sends the N signal sets, where each of the N signal sets is used to transmit the control information of the one or more second wireless network devices, N is an integer greater than 2, and the signal set includes the PDCCH or the PDCCH and the PCFICH. The first wireless network device sends the signal set to the second wireless network device on the resource that can be occupied by each signal set, the first wireless network device performs sending processing on each signal set, and the sending processing includes performing at least one of multiplexing, scrambling, modulation, interleaving, or resource mapping on the signal in each signal set. The second wireless network device determines the resource that can be occupied by the received signal set, and receives the signal on the resource that can be occupied by the received signal set, so as to obtain the control information sent by the first wireless network device. It may be learned that in the technical solutions disclosed in the embodiments of the present disclosure, interference between signal sets sent by using a narrow beam may be canceled, PDCCH (or PCFICH and PDCCH) transmission reliability may be improved, and the second wireless network device receives the PDCCH (or the PCFICH and the PDCCH) on the resource that can be occupied by the received signal set, so as to reduce complexity of detecting a signal by the second wireless network device. In addition, if air interface features of different services are transmitted on a same carrier in the communications system, each signal set may be corresponding to a type of service or a type of air interface feature (when different air interface features are used). The second wireless network device may receive a signal in a signal set on a resource that can be occupied by a signal set corresponding to a received service or a signal set corresponding to an air interface feature of accessed air interface (when different air interface features are used), so as to obtain the control information sent by the first wireless network device. Therefore, in the technical solutions provided in the embodiments of the present disclosure, a problem of transmitting a PDCCH (or a PDCCH and a PHICH) when air interface features of different services are transmitted on a same carrier in the communications system may be further resolved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic diagram of an application scenario according to an embodiment of the present disclosure;

FIG. 2 is a schematic flowchart of a physical downlink control channel transmission method according to Embodiment 1 of the present disclosure;

FIG. 3-*a* is a schematic diagram of a resource allocation method of a signal set according to Embodiment 1 of the present disclosure;

FIG. 3-*b* is a schematic diagram of another resource allocation method of a signal set according to Embodiment 1 of the present disclosure;

FIG. 4 is a schematic flowchart of a physical downlink control channel transmission method according to Embodiment 2 of the present disclosure;

FIG. 5-*a* is a schematic diagram of REG distribution of a PCFICH according to Embodiment 3 of the present disclosure;

FIG. 5-*b* is a schematic diagram of other REG distribution of a PCFICH according to Embodiment 3 of the present disclosure;

FIG. 6 is a schematic flowchart of a physical downlink control channel transmission method according to Embodiment 4 of the present disclosure;

DESCRIPTION OF EMBODIMENTS

Figure 7:
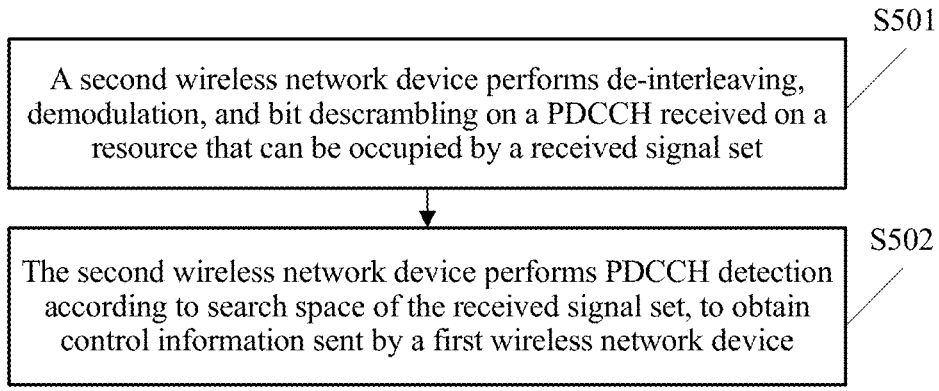
FIG. 7 is a schematic flowchart of a physical downlink control channel transmission method according to Embodiment 5 of the present disclosure.

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Terms such as "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

In addition, in this application, various aspects are described with reference to wireless network devices that include a first wireless network device and a second wireless network device. The first wireless network device may be a base station, and the base station may be configured to communicate with one or more user equipments, or may be configured to communicate with one or more base stations (for example, a micro base station, an access point, and a relay) with some user equipment functions. Alternatively, the first wireless network device may be user equipment, and is configured to communicate with one or more user equipments (for example, a D2D device). The second wireless network device may be user equipment, and the user equipment may be configured to communicate with a base station, or may be configured to communicate with user equipment (for example, a D2D device) with some base station functions. Alternatively, the second wireless network device may be a base station device (for example, a micro base station, an access point, and a relay), and is configured to communicate with a base station. That is, the technical solutions provided in this application may be applied between a base station and user equipment, or may be applied between base stations (for example, between a macro base station, a micro base station, an access point, and a relay), or may be applied between user equipment (for example, between D2D devices). This is not limited herein.

The base station may also be referred to as an access point, a node, a NodeB, an evolved NodeB (eNB), or another network entity. In addition, the base station may include some or all functions of the foregoing network entities. The base station may communicate with a wireless terminal by using an air interface. The communication may be performed by using one or more sectors. The base station may serve as a router between the wireless terminal and a rest part of an access network by converting a received air interface frame into an IP packet. The access network includes an Internet Protocol (IP) network. The base station may further coordinate management of an air interface attribute, and may be a gateway between a wired network and a wireless network. The user equipment may also be referred to as a user terminal, and may include some or all functions of a system, a subscriber unit, a subscriber station, a mobile station, a mobile wireless terminal, a mobile device, anode, a device, a remote station, a remote terminal, a terminal, a wireless communications device, a wireless communications apparatus, or a user agent. The user equipment may be a cellular phone, a cordless telephone set, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device used for communication in a wireless system.

All aspects, embodiments, or features are presented in this application by describing a system that may include multiple devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of the present disclosure is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of the present disclosure, one of "information", "signal", "message", or "channel" may be used in some cases. It should be noted that expressed meanings are consistent when differences are not emphasized.

In the specification, claims, and accompanying drawings of the present disclosure, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A physical downlink control channel transmission method disclosed in the embodiments of the present disclosure is particularly applicable to a wireless communications system in which transmission is performed by using a narrow beam. Specifically, the method may be applied to an LTE-A carrier aggregation technology in which a carrier in a relatively low frequency band of at least 6 GHz and a millimeter wave high frequency band carrier are aggregated to provide larger bandwidth and a higher transmission rate for a user. The carrier in a relatively low frequency band of at least 6 GHz serves as a primary serving cell (PCell) to provide a basic service for UE. The millimeter wave high frequency band carrier serves as a secondary serving cell (SCell) to provide an enhancement service for the UE. The PCell and the SCell may be co-located or may be non-co-located. A coverage area of the SCell is within a coverage area of the PCell, or a coverage area of the SCell and a coverage area of the PCell overlap each other. When the PCell and the SCell are non-co-located, a PCell base station is connected to, by using a fiber or by means of wireless backhaul, an SCell base station or a remote radio unit (RRU) that provides SCell air interface transmission. A microwave or millimeter wave band may be applied to a wireless backhaul connection, and the band used for the wireless connection and a band in which the SCell is located may be the same or different. Referring to FIG. 1, FIG. 1 is a schematic diagram of an application scenario of the physical downlink control channel transmission method according to the embodiments of the present disclosure. The PCell and The SCell are non-co-located, and the coverage area of the SCell is within the coverage area of the PCell. In the figure, the SCell uses a millimeter wave high frequency band carrier to provide a service for UE. A PCell base station and an SCell base station may be connected by using a fiber or by means of wireless backhaul.

In addition, the technical solutions disclosed in the embodiments of the present disclosure may also be used in an LTE single carrier transmission technology. For example, the technical solutions may be used in an LTE system in which a cell in a millimeter wave high frequency band is used to provide a service for UE, or an LTE system in which a cell in a low frequency band of at least 6 GHz is used to provide a service for UE by using a narrow beam.

The method disclosed in the embodiments of the present disclosure is also applicable to a wireless communications system in which different services are transmitted on a same carrier. A type of service or some services may use a type of air interface feature, and another type of service or some other services may use another different air interface feature. In the wireless communications system, each type of service or each type of air interface feature is transmitted by occupying a specified radio resource. UE may receive, by detecting a synchronization signal or a broadcast signal, an air interface feature corresponding to a service that needs to be received, and receive control information that is of the service or the air interface feature and that is sent by a base station, so as to receive data of the service.

A network architecture and a service scenario described in the embodiments of the present disclosure are intended to describe the technical solutions in the embodiments of the present disclosure more clearly, but are not construed as a limitation on the technical solutions provided in the embodiments of the present disclosure. A person of ordinary skill in the art may understand that, with evolution of the network architecture and emergence of a new service scenario, the technical solutions provided in the embodiments of the present disclosure are also applicable to a similar technical problem. For example, the embodiments of the present disclosure may be applied to both a time division duplex (TDD) scenario and a frequency division duplex (FDD) scenario. The embodiments of the present disclosure may be applied to both an LTE network and another wireless communications network. When the embodiments of the present disclosure are applied to another wireless communications network, a corresponding name may be replaced with a name of a corresponding function in the another wireless communications network.

Embodiment 1 of the present disclosure provides a physical downlink control channel transmission method, and the method is applied to a first wireless network device. The first wireless network device sends N signal sets, each signal set is used to transmit control information of one or more second wireless network devices, N is an integer greater than 2, and a signal in the signal set includes a PDCCH or a PDCCH and a PCFICH. FIG. 2 is a schematic flowchart of Embodiment 1 according to the present disclosure. As shown in FIG. 2, the technical solution disclosed in this embodiment of the present disclosure includes the following step:

S101. The first wireless network device sends each signal set to the second wireless network device on a resource that can be occupied by the signal set, where the first wireless network device performs sending processing on a signal in each signal set, and the sending processing includes at least one of multiplexing, scrambling, modulation, interleaving, or resource mapping.

The method is particularly applicable to a communications system in which transmission is performed by using a narrow beam. For example, the first wireless network device may send each signal set by using an antenna beam or a virtual antenna port. There may be a correspondence between a beam and an antenna port or a virtual antenna. For example, a beam 1 is corresponding to one or more antennas or virtual antennas a1, a2, and a3, and a beam 2 is corresponding to one or more antennas or virtual antennas b1 and b2. The virtual antenna is an antenna formed after multiple antennas are weighted. Beams are classified into an analog beam and a digital beam according to a forming manner. The analog beam is a beam formed in a radio frequency by using an analog device, for example, a phase shifter, a delay unit, or a waveguide. The analog beam cannot change after the analog beam is formed, and only a beam direction can be changed. Consequently, adaptive control of a beam is difficult to implement. The digital beam is a beam implemented on a baseband by using a complex-weighting method in a digital technology. The digital beam retains all information about an antenna array unit signal. An antenna array signal is processed by using an advanced digital signal processing technology, and therefore has good beam performance. A hybrid beam is a beam that combines the analog beam and the digital beam. In this case, there may be a correspondence between an identifier of a beam and an identifier of a signal set.

In a cell provided in this embodiment of the present disclosure, there may be a correspondence between a signal set and a synchronization signal set. One synchronization signal set may be corresponding to one signal set in this embodiment of the present disclosure, or one synchronization signal set is corresponding to multiple signal sets, or multiple synchronization signal sets are corresponding to one signal set. A synchronization signal in the cell is also transmitted by using different beams. For example, eight synchronization signal sets are sent in one cell.

In specific implementation, the first wireless network device determines a resource that can be occupied by each signal set, and the resource of each signal set includes subcarriers of one or more resource blocks (RB) in a frequency domain, and includes one or more symbols in a time domain. Resources occupied by different signal sets do not overlap, to avoid mutual interference. For example, LTE system full bandwidth is 20 M and includes 110 RBs. If the system full bandwidth is divided into 10 frequency sub-bands, each frequency sub-band includes subcarriers of 11 consecutive RBs, and each signal set may be transmitted by occupying different frequency sub-bands. For example, if the first wireless network device sends five signal sets, and the 10 frequency sub-bands are allocated to the five signal sets, each signal set may occupy two frequency sub-bands.

Each signal set may occupy a frequency sub-band resource in various manners. For example, each signal set may occupy an average resource, or the signal sets may occupy different quantities of frequency sub-band resources. As described in the foregoing example, each signal set may occupy two frequency sub-bands, that is, occupy subcarriers of 22 RBs. For another example, resources that can be occupied by each signal set may be consecutive or inconsecutive. As shown in FIG. 3-*a* and FIG. 3-*b*, each of the five signal sets occupies two inconsecutive frequency sub-bands. For still another example, a base station may allocate same frequency sub-bands of all time domain symbols to a same signal set, or may allocate same frequency sub-bands of all time domain symbols to different signal sets. FIG. 3-*a* is a schematic diagram of a case in which same frequency sub-bands of all time domain symbols are allocated to a same signal set. As shown in FIG. 3-*a*, in three time domain symbols occupied by a PDCCH, same frequency sub-bands of all PDCCH time domain symbols are allocated to a same signal set. FIG. 3-*b* is a schematic diagram of a case in which same frequency sub-bands of all time domain symbols are allocated to different signal sets. As shown in FIG. 3-*b*, in three time domain symbols occupied by a PDCCH, same frequency sub-bands of all PDCCH time domain symbols are allocated to different signal sets. It may be learned, from FIG. 3-*b*, that a signal set 0 occupies a first frequency sub-band and a sixth frequency sub-band of a first time domain symbol, the signal set 0 occupies a fifth frequency sub-band and a tenth frequency sub-band of a second time domain symbol, the signal set 0 occupies a fourth frequency sub-band and a ninth frequency sub-band of a third time domain symbol, and the signal set 0 occupies different frequency sub-bands of all the time domain symbols.

In specific implementation, the first wireless network device may first determine a second wireless network device that needs to be scheduled for each signal set, so as to send a PCFICH and a PDCCH to the second wireless network device. The PDCCH in the signal set is used to transmit control information that is used to schedule the second wireless network device. In the prior art, after receiving an uplink random access request sent by UE, a base station schedules the UE in a cell that is accessed by the UE. For a method in which the first wireless network device determines the second wireless network device that needs to be scheduled for each signal set, a method similar to a method in which a base station determines scheduled UE in each cell in the prior art may be used. That is, the first wireless network device may determine a received signal set of the second wireless network device by using an uplink signal sent by the second wireless network device, and schedule the second wireless network device. Specific implementation may be determined according to an actual situation. This is not specified in the present disclosure.

After determining the received signal set of the second wireless network device that needs to be scheduled, the first wireless network device performs resource scheduling on the second wireless network device for receiving each signal set according to information such as data caching and channel quality, generates control information according to a scheduling result, and then generates a PDCCH according to the control information. A total quantity of resources occupied by a PDCCH that is in each signal set and that is used to schedule the second wireless network device does not exceed a maximum quantity of resources that can be occupied by the PDCCH in the signal set. The first wireless network device calculates resources occupied by the PDCCH that is in each signal set and that is used to schedule the second wireless network device, so as to obtain a quantity of time domain symbols occupied by the PDCCH transmitted in each signal set. Because quantities of different second wireless network devices scheduled for all signal sets are different and control information formats are different, the quantities of time domain symbols occupied by the PDCCHs in all the signal sets may be different.

A quantity of symbols occupied by a PDCCH in a signal set in each subframe may be changeable or may be fixed. The first wireless network device may send, to the second wireless network device by using a control format indicator (CFI) in a PCFICH in each signal set, information about the quantity of time domain symbols occupied by the PDCCH in each signal set. A PCFICH in each signal set occupies a first time domain symbol of a resource of the signal set, and may be distributed on one frequency sub-band of the signal set or may be evenly distributed on multiple frequency sub-bands in the frequency domain.

The first wireless network device may notify, by using the PCFICH, the second wireless network device of the quantity of symbols occupied by the PDCCH in the signal set, or may notify the second wireless network device by using a system broadcast message or an RRC message, or the quantity of symbols occupied by the PDCCH in the signal set is a preset quantity of symbols. When the first wireless network device sends a PCFICH, a PCFICH in each signal set is used to indicate a quantity of time domain symbols occupied by a PDCCH in the signal set. When the first wireless network device sends no PCFICH, the system broadcast message or the RRC message is used to indicate a quantity of time domain symbols occupied by a PDCCH in each signal set, or a quantity of time domain symbols occupied by a PDCCH in each signal set is a preset quantity of time domain symbols.

After determining the time domain symbols occupied by the PDCCH in each signal set, the first wireless network device sends the PDCCH in each signal set by using a resource of the signal set. The first wireless network device performs at least one of multiplexing, scrambling, modulation, interleaving, or resource mapping on the PDCCH in each signal set. For example, the first wireless network device multiplexes a PDCCH bit of each signal set, to obtain a PDCCH bit sequence of each signal set, then performs scrambling, modulation, and symbol interleaving on the PDCCH bit sequence of each signal set, and finally maps, for sending, interleaved PDCCH data to a resource that can be occupied by each signal set.

It should be noted that a CCE that can be occupied by a PDCCH in each signal set is independently numbered, search space of each signal set at a CCE aggregation level L is defined according to a candidate PDCCH set in the signal set, and the candidate PDCCH set in each signal set is determined according to a CCE number of the signal set. The first wireless network device performs resource scheduling on a second wireless network device for receiving each signal set according to search space of the signal set.

In specific implementation, in order that the second wireless network device determines a received signal set to send an uplink signal, and detects and receives a PDCCH (or a PHICH and a PDCCH) on a resource of the received signal set, the first wireless network device sends information or a signal to the second wireless network device, so as to notify the second wireless network device of the received signal set and the resource that can be occupied by the received signal set. The resource that can be occupied by each signal set is distributed within system bandwidth and a time domain symbol occupied by the PDCCH in the signal set.

The first wireless network device may send a cell-specific reference signal (CRS), and the second wireless network device determines the received signal set by detecting the CRS; or the first wireless network device notifies the second wireless network device of the received signal set by sending an RRC message.

The first wireless network device may notify, by using different methods, the second wireless network device of the resource that can be occupied by the received signal set. For example, the first wireless network device sends a size of a frequency sub-band and a total quantity of signal sets or a total quantity of frequency sub-bands and a total quantity of signal sets to the second wireless network device. The size of the frequency sub-band and the total quantity of signal sets or the total quantity of frequency sub-bands and the total quantity of signal sets are used by the second wireless network device to calculate, according to a predefined resource allocation algorithm, the resource that can be occupied by the received signal set. The frequency sub-band includes one or more RBs. Alternatively, the first wireless network device may send the CRS, and the second wireless network device determines, by detecting the CRS, the resource that can be occupied by the received signal set. Alternatively, the first wireless network device notifies, by sending a PCFICH, the second wireless network device of the resource that can be occupied by the received signal set. Alternatively, the first wireless network device notifies, by sending the RRC message to the second wireless network device, the resource that is occupied by the received signal set.

In some feasible implementations, after receiving the total quantity of signal sets and the size of the frequency sub-band (or the total quantity of frequency sub-bands and the total quantity of signal sets) that are sent by the first wireless network device, the second wireless network device may calculate, according to the predefined resource allocation algorithm, the resource that can be occupied by each signal set. Then the second wireless network device determines the received signal set by detecting the CRS sent by the first wireless network device, or determines the received signal set by receiving the RRC message sent by the first wireless network device, so as to determine the resource that can be occupied by the received signal set.

In some feasible implementations, the second wireless network device determines the received signal set by detecting the CRS sent by the first wireless network device, or determines the received signal set by receiving the RRC message sent by the first wireless network device. Then the second wireless network device detects a PCFICH in the received signal set to determine a frequency sub-band occupied by the received signal set.

In some feasible implementations, the second wireless network device detects the CRS sent by the first wireless network device, so as to determine the received signal set, or determines the received signal set by receiving the RRC message sent by the first wireless network device, and may further determine, by detecting the CRS sent by the first wireless network device, the resource that can be occupied by the received signal set.

In some other feasible implementations, the first wireless network device may send no indication information or signal to the second wireless network device, and the second wireless network device independently detects the resource that can be occupied by the received signal set. If the second wireless network device successfully receives a signal set, it is considered that the currently received signal set is the received signal set, and a currently detected resource is the resource that can be occupied by the received signal set.

After determining a frequency sub-band resource of the received signal set, the second wireless network device may perform receiving processing on a signal in the signal set on the resource of the received signal set, that is, execute an inverse process of the sending processing of the first wireless network device. Specifically, the receiving processing may include at least one of determining search space, de-interleaving, demodulation, or descrambling.

It should be noted that if the technical solution of the present disclosure is applied to a wireless communications system in which each service occupies a specified radio resource, and transmission is performed by using a specified air interface feature (for example, a specified subcarrier spacing and/or a specified CP length), the first wireless network device does not need to send the foregoing information or signal to the second wireless network device to notify the second wireless network device of the received signal set and the resource that can be occupied by the received signal set. The UE may determine, by detecting a synchronization signal, a synchronization signal of a service that needs to be received, determine an air interface feature corresponding to the received service, and determine, by receiving the broadcast channel, a radio resource occupied by the service or the air interface feature, so as to receive a PDCCH (or a PHICH and a PDCCH) that is of the service or the air interface feature and that is sent by the base station, and receive data of the service.

It may be learned that in the technical solution disclosed in this embodiment of the present disclosure, interference between signal sets sent by using a narrow beam may be canceled, PDCCH (or PCFICH and PDCCH) transmission reliability may be improved, and the second wireless network device receives the PDCCH (or the PCFICH and the PDCCH) on the resource that can be occupied by the received signal set, so as to reduce complexity of detecting a signal by the second wireless network device. In addition, in the technical solution provided in this embodiment of the present disclosure, a problem of transmitting a PDCCH (or a PDCCH and a PHICH) when different services are transmitted on a same carrier in the communications system, different air interface features may be used for different services, and each signal set is corresponding to one type of service or one type of air interface feature may be further resolved.

Embodiment 2 disclosed in the present disclosure provides a physical downlink control channel transmission method. Referring to FIG. 4, FIG. 4 is a schematic flowchart of the physical downlink control channel transmission method according to Embodiment 2 of the present disclosure. As shown in FIG. 4, the method may include the following steps.

S201. A first wireless network device multiplexes a PDCCH bit of each signal set.

The first wireless network device determines a received signal set of a second wireless network device, schedules the second wireless network device according to information such as data caching and channel quality, generates control information and adds CRC information after the control information is generated, scrambles the CRC information by using a radio network temporary identifier (RNTI), and obtains a PDCCH corresponding to the control information after performing channel encoding and rate matching.

It should be noted that the first wireless network device may schedule the second wireless network device according to search space of a PDCCH in each signal set, and the search space of the PDCCH in each signal set is independent of each other, and a CCE that can be occupied by the PDCCH in each signal set is independently numbered. Search space of a signal set at a CCE aggregation level L is defined according to a candidate PDCCH set in the signal set, and the candidate PDCCH set in the signal set is determined according to a CCE number of the signal set.

Search space of a signal set j at the CCE aggregation level L is: $L\{(Y_k+m') \bmod \lfloor N_{CCE,k}^{Bj}/L \rfloor\}+i$, and $L\{(Y_k+m') \bmod \lfloor N_{CCE,k}^{Bj}/L \rfloor\}$ represents a start CCE number of each candidate PDCCH, where $i=0, \ldots,$ and $L-1$, $N_{CCE,k}^{Bj}$ is a total quantity of CCEs of a resource that can be occupied by the signal set j in a subframe k, the aggregation level is a positive integer, for example, $L \in \{1, 2, 4, 8, \ldots\}$, $m'=m+M^{(L)}-n_{CI}$, and $n_{CI}$ is a value in a carrier indicator field, or if no carrier indicator field is configured, $m'=m$, $m=0, \ldots,$ and $M^{(L)}-1$, and $M^{(L)}$ is a quantity of candidate PDCCHs in the search space at the CCE aggregation level L. For common search space, $Y_k=0$; for UE-specific search space at the aggregation level L, $Y_k$ is defined as: $Y_k=(A \cdot Y_{k-1}) \bmod D$. A and D are random integer coefficients (for example, A and D may be values in an existing protocol, for example, A=39827, and D=65537), $Y_{-1}=n_{RNTI} \neq 0$, and $n_{RNTI}$ is a radio network temporary identifier. A CCE number of each signal set is associated with search space, so that when multiple PDCCH signal sets are transmitted, the second wireless network device may correctly find, according to an identifier of a signal set of the second wireless network device, search space that needs to be monitored by the second wireless network device, so as to implement correct encoding.

After obtaining a PDCCH in each signal set, the first wireless network device may multiplex a PDCCH bit of the signal set, to obtain a PDCCH bit sequence of the signal set. Multiplexing means that PDCCH bits in the signal set are joined to form a bit sequence, and the bit sequence may be expressed as:

$$b^{(B)(0)}(0), \ldots, b^{(B)(0)}(M_{bit}^{(B_i)(0)} - 1), \ldots, b^{(B_i)(n_{PDCCH}^{B_i}-1)}(0),$$
$$\ldots, b^{(B_i)(n_{PDCCH}^{B_i}-1)}(M_{bit}^{(B_i)(n_{PDCCH}^{B_i}-1)} - 1),$$

where $M_{bit}^{(b_i,j)}$ is a quantity of bits occupied by a $j^{th}$ PDCCH in a signal set I, j=0, 1, ..., and $n_{PDCCH}^{B_i}-1$, and $n_{PDCCH}^{B_i}$ is a quantity of PDCCHs in the signal set i.

S202. The first wireless network device scrambles, modulates, and interleaves a PDCCH bit sequence of each signal set, to obtain a PDCCH symbol pair sequence of each signal set.

After obtaining a PDCCH bit sequence of each signal set, the first wireless network device scrambles, modulates, and interleaves the PDCCH bit sequence of the signal set, to obtain PDCCH data of the signal set.

The first wireless network device scrambles the PDCCH bit sequence of each signal set, and a scrambled PDCCH bit sequence may be expressed as: $\tilde{b}(i)=(b(i)+c(i))\mod 2$. A scrambled sequence c(i) is initialized to $$c_{init} = \lfloor n_s/2 \rfloor 2^w + N_{ID}^{cell} \cdot N_{beamsum} + N_{ID}^{beam},$$
$$w = \lceil \log_2(N_{ID}^{cell} \cdot N_{beamsum}) \rceil,$$

$n_s$ is a timeslot number, $N_{ID}^{cell}$ is a physical cell identifier (in any embodiment of the present disclosure, $N_{ID}^{cell}$ may also be referred to as a cell identifier or a physical identifier of a cell), $N_{beamsum}$ is a quantity of signal sets, and $N_{ID}^{beam}$ is an identifier of a signal set. When the second wireless network device descrambles the received PDCCH bit sequence, the foregoing c(i) is also used for descrambling.

In specific implementation, if a total quantity of bits in a scrambled PDCCH bit sequence of a signal set is not K×Q times a total quantity of REGs that can be occupied by the signal set, a trailing bit may be added after the PDCCH bit sequence of the signal set, so that the total quantity of bits in the PDCCH bit sequence set in the signal set, and the candidate PDCCH set in the signal set is determined according to a CCE number of the signal set.

The first wireless network device performs modulation and symbol interleaving on the PDCCH bit sequence of each signal set after scrambling. Specifically, a PDCCH symbol sequence of each signal set is obtained after the PDCCH bit sequence of each signal set is modulated. To map the PDCCH symbol sequence to the REG, interleaving is performed by using every K symbols in the PDCCH symbol sequence as one symbol pair, and a PDCCH symbol pair sequence $\overline{w}^{(p)}(0), \ldots$, and $\overline{w}^{(p)}(M_{quad}-1)$ sent by an antenna port p is obtained after interleaving. $M_{quad}$ is a total quantity of symbol pairs.

S203. The first wireless network device maps, for sending, the PDCCH symbol pair sequence of each signal set to a resource that can be occupied by the signal set.

After interleaving the PDCCH symbol sequence of each signal set, the first wireless network device maps, for sending, the PDCCH symbol pair sequence of each signal set to a resource that can be occupied by the signal set.

Specifically, the first wireless network device maps the PDCCH symbol pair sequence of each signal set to a REG, a resource that is occupied by the signal set first in a time domain and then in a frequency domain. Embodiment 2 of the present disclosure provides a PDCCH symbol mapping method, and the PDCCH symbol pair sequence of each signal set may be mapped according to a sequence of signal set numbers. The method may include the following steps:

A01. Set an identifier i of a signal set to 0, and start to perform symbol mapping from a signal set 0.

A02. Set a symbol pair number m' to 0, and select a first symbol pair of a PDCCH symbol pair sequence of a signal set i.

A03. Initialize a subcarrier number k' of an RE to 0, and start to perform mapping from a resource element (RE, Resource Element) of a subcarrier 0.

A04. Initialize a time domain symbol number l' of an RE to 0, and start to perform mapping from an RE of a symbol 0.

A05. Determine whether RE represents a start location of a REG of the signal set i, and that the REG is allocated to no PCFICH or PHICH, and if the $RE^{(k',l')}$ represents the start location of the REG of the signal set i, perform A06 and A07, or if the RE (k',l') does not represent the start location of the REG of the signal set i, perform A08.

A06. For each antenna port p, map a symbol pair $\overline{w}^{(p)}(m')$ to a REG represented by the $RE^{(k',l')}$.

A07. Increase m' by one, and select a next symbol pair of the PDCCH symbol pair sequence of the signal set i.

A08. Increase l' by one, and move to an RE of a next time domain symbol.

A09. Determine whether l'<W, and if l'<W, return to step A05, where W is a quantity of time domain symbols occupied by a PDCCH in the signal set i; or if l'≥W, perform step A10.

A10. Increase k' by one, and move to a next subcarrier.

A11. Determine whether $k'<N_{RB}^{DL} \cdot N_{sc}^{RB}$, and if $k'<N_{RB}^{DL} \cdot N_{sc}^{RB}$ perform A04, and start to perform mapping on a REG of the next subcarrier; or if $k' \geq N_{RB}^{DL} \cdot N_{sc}^{RB}$, mapping of a PDCCH symbol sequence of the signal set i has been completed, and perform A12.

A12. Increase the identifier i of the signal set by one, and start to perform symbol mapping of a next signal set.

A13. Determine whether $i<N_{beamnum}$ and if $<N_{beamnum}$, perform A03, or if $i \geq N_{beamnum}$, it indicates that mapping of PDCCH symbol sequences of all signal sets has been completed, and the procedure ends.

In some feasible implementations, steps A01 to A13 may be further optimized. For example, the first wireless network device may start to perform mapping from a subcarrier that belongs to the signal set. In a REG mapping process, when the first wireless network device determines that a subcarrier does not belong to a resource that can be occupied by the signal set, it may be determined that no RE of the subcarrier represents the start location of the REG of the signal set i, and all determining steps of time domain symbols on the subcarrier may be skipped.

In the technical solution provided in this embodiment of the present disclosure, the first wireless network device sends N signal sets, each signal set is used to transmit control information of one or more second wireless network devices, and the first wireless network device performs multiplexing, scrambling, modulation, interleaving, and resource mapping on a PDCCH in each signal set. It may be learned that in the solution, interference between signal sets sent by using a narrow beam may be canceled, PDCCH transmission reliability may be improved, and the second wireless network device receives the PDCCH on a resource that can be occupied by the received signal set, so as to reduce complexity of detecting a signal by the second wireless network device. In addition, in the technical solution provided in this embodiment of the present disclosure, a problem of transmitting a PDCCH (or a PDCCH and a PHICH) when different services are transmitted on a same carrier in a communications system (different air interface features may be used for different services), and each signal set is corresponding to one type of service or one type of air interface feature may be further resolved.

Embodiment 3 of the present disclosure discloses a physical downlink control channel transmission method, and the method is used by a first wireless network device to send a PCFICH in a signal set to a second wireless network device. In Embodiment 3 of the present disclosure, the first wireless network device sends the PCFICH to the second wireless network device by using a first time domain symbol of a resource that can be occupied by each signal set, and a PCFICH in each signal set occupies C REGs. For example, the PCFICH in each signal set can occupy four REGs.

In specific implementation, the PCFICH in each signal set may be on one frequency sub-band occupied by the signal set. As shown in FIG. 5-$a$, a PCFICH sent in each of four signal sets B0 to B3 is distributed on one frequency sub-band. Alternatively, the PCFICH sent in each signal set may be distributed on multiple frequency sub-bands occupied by the signal set. As shown in FIG. 5-$b$, a PCFICH sent in each of four signal sets B0 to B3 is distributed on two frequency sub-bands. The first wireless network device and the second wireless network device may predefine a REG distribution rule of the PCFICH, or the first wireless network device may enable, by using a system broadcast message or an RRC message, the second wireless network device to obtain a REG distribution rule of the PCFICH.

For example, if the REGs are distributed on one frequency sub-band that can be occupied by each signal set, according to the REG distribution rule, locations of the four REGs that are occupied by the PCFICH are determined by using the following formulas:

a subcarrier location of a first REG is: $k = k_{start}^{B_i} + \overline{k}$;

a subcarrier location of a second REG is:

$$k = (k_{start}^{B_i} + \overline{k} + \lfloor N_{RB}^{subband}/2 \rfloor \cdot N_{sc}^{RB}/2) \bmod N_{RB}^{subband} N_{sc}^{RB};$$

a subcarrier location of a third REG is:

$$k = (k_{start}^{B_i} + \overline{k} + \lfloor 2N_{RB}^{subband}/2 \rfloor \cdot N_{sc}^{RB}/2) \bmod N_{RB}^{subband} N_{sc}^{RB};$$ and a subcarrier location of a fourth REG is:

$$k = (k_{start}^{B_i} + \overline{k} + \lfloor 3N_{RB}^{subband}/2 \rfloor \cdot N_{sc}^{RB}/2) \bmod N_{RB}^{subband} N_{sc}^{RB}; \text{ where}$$

$\overline{k} = (N_{sc}^{RB}/2) \cdot (N_{ID}^{cellX} \bmod 2N_{RB}^{subband})$, $N_{ID}^{cell}$ is a physical cell identifier, $k_{start}^{B_i}$ is a start subcarrier location offset of a PCFICH in a signal set i, $N_{RB}^{subband}$ is a quantity of RBs included in the frequency sub-band, and $N_{sc}^{RB}$ is a quantity of subcarriers included in one RB.

For another example, if the four REGs are distributed on two frequency sub-bands that can be occupied by the signal set, according to the REG distribution rule, a first REG and a second REG are distributed on a first frequency sub-band, and a third REG and a fourth REG are distributed on a second frequency sub-band, locations of the four REGs that are occupied by the PCFICH may be determined by using the following formulas:

a subcarrier location of the first REG is: $k = k_{start}^{B_i,1} + \overline{k}$;

a subcarrier location of the second REG is: $k = k_{start}^{B_i,1} + (k + N_{RB}^{subband} \cdot N_{sc}^{RB}/2) \bmod N_{RB}^{subband} N_{sc}^{RB}$;

a subcarrier location of the third REG is: $k = k_{start}^{B_i,2} \overline{k}$; and a subcarrier location of the fourth REG is: $k = k_{start}^{B_i,2} + (k + N_{RB}^{subband} \cdot N_{sc}^{RB}/2) \bmod B_{RB}^{subband} N_{sc}^{RB}$, where $k = (N_{sc}^{RB}/2) \cdot (N_{ID}^{cell} \bmod 2N_{RB}^{subband})$, $N_{ID}^{cell}$ is a physical cell identifier, $k_{start}^{B_i,j}$ start is a start subcarrier offset of a PCFICH that is in a signal set i and that is distributed on a $j^{th}$ frequency sub-band, $N_{RB}^{subband}$ is a quantity of RBs included in the frequency sub-band, and $N_{sc}^{RB}$ is a quantity of subcarriers included in one RB.

For still another example, if the four REGs are distributed on three frequency sub-bands that are occupied by the signal set, according to the REG distribution rule, a first REG and a second REG are distributed on a first frequency sub-band, a third REG is distributed on a second frequency sub-band, and a fourth REG is distributed on a third frequency sub-band. Locations of the four REGs occupied by the PCFICH may be determined by using the following formulas:

a subcarrier location of the first REG is: $k = k_{start}^{B_i,1} + \overline{k}$;

a subcarrier location of the second REG is: $k = k_{start}^{B_i,1} + (\overline{k} + N_{RB}^{subband} \cdot N_{sc}^{RB}/2) \bmod N_{RB}^{subband} N_{sc}^{RB}$;

a subcarrier location of the third REG is: $k = k_{start}^{B_i,2} + \overline{k}$; and a subcarrier location of the fourth REG is: $k = k_{start}^{B_i,3} + \overline{k}$, where $k = (N_{sc}^{RB}/2) \cdot (N_{ID}^{cell} \bmod 2N_{RB}^{subband})$, $N_{ID}^{cell}$ is a physical cell identifier, $k_{start}^{B_i,j}$ is a start subcarrier offset of a PCFICH that is in a signal set i and that is distributed on a $j^{th}$ frequency sub-band, $N_{RB}^{subband}$ is a quantity of RBs included in the frequency sub-band, and $N_{sc}^{RB}$ is a quantity of subcarriers included in one RB.

It may be learned that in the technical solution disclosed in Embodiment 3 of the present disclosure, a PCFICH in each signal set is mapped to one or more frequency sub-bands that can be occupied by the signal set, and the PCFICH in each signal set is transmitted on different resources, so as to cancel mutual interference between PCFICHs in different signal sets. In addition, in the technical solution provided in Embodiment 3 of the present disclosure, a problem of transmitting a PDCCH (or a PDCCH and a PHICH) when different services are transmitted on a same carrier in a communications system (different air interface features may be used for different services), and each signal set is corresponding to one type of service or one type of air interface technology may be further resolved.

Embodiment 4 of the present disclosure provides a physical downlink control channel transmission method, and the method is applied to a second wireless network device. Referring to FIG. 6, FIG. 6 is a schematic flowchart of the method provided in Embodiment 4 of the present disclosure. As shown in FIG. 6, the method provided in Embodiment 4 of the present disclosure may include the following steps.

S401. The second wireless network device determines a resource that can be occupied by a received signal set, where a signal in the signal set includes a PDCCH or a PDCCH and a PCFICH, and the resource that can be occupied by the signal set is lower than system bandwidth in a frequency domain.

A first wireless network device sends N signal sets, each signal set is used to transmit control information of one or more second wireless network devices, N is an integer greater than 2, and a signal in the signal set includes a PDCCH or a PDCCH and a PCFICH. The first wireless network device determines a resource that can be occupied by each signal set, different signal sets may occupy resources that do not overlap, so as to avoid mutual interference, and the resource that can be occupied by each signal set may include subcarriers of one or more RBs in the frequency domain, and include one or more symbols in a time domain. The resource that can be occupied by each signal set is distributed within system bandwidth and a time domain symbol occupied by the PDCCH in the signal set.

The second wireless network device may first determine the resource that can be occupied by the received signal set, and then receive a signal in the signal set on the resource of the received signal set, so as to obtain the control information sent by the first wireless network device.

The first wireless network device may enable, by using multiple methods, the second wireless network device to obtain the resource that can be occupied by the received signal set. In a specific implementation process, different methods cause different implementations. For example, the first wireless network device may notify the second wireless network device of a size of a frequency sub-band (or a total quantity of frequency sub-bands) and a total quantity of signal sets, and the second wireless network device determines, according to the size of the frequency sub-band (or the total quantity of frequency sub-bands) and the total quantity of signal sets by using a predefined frequency sub-band allocation algorithm, the resource that can be occupied by each signal set. Alternatively, the second wireless network device may obtain, by detecting a CRS sent by the first wireless network device, the resource that can be occupied by the received signal set. Alternatively, the second wireless network device may obtain, by receiving a PCFICH in the received signal set sent by the first wireless network device, the resource that can be occupied by the received signal set. Alternatively, the second wireless network device may obtain, by receiving an RRC message sent by the first wireless network device, the resource that can be occupied by the received signal set.

In some feasible implementations, the second wireless network device needs to determine the received signal set before determining the resource that can be occupied by the received signal set. The second wireless network device may determine the received signal set by using multiple methods. For example, the second wireless network device may determine the received signal set by detecting the CRS sent by the first wireless network device, or the second wireless network device may determine the received signal set by receiving the RRC message sent by the first wireless network device.

After determining the received signal set, the second wireless network device may send an uplink signal to the first wireless network device, so that a base station learns of a signal set that needs to be received by the second wireless network device, and schedules the second wireless network device. Specific implementation may be determined according to an actual situation, and is not specified herein.

It should be noted that if the technical solution of the present disclosure is applied to a wireless communications system in which each service occupies a specified radio resource, and transmission is performed by using a specified air interface feature (for example, a specified subcarrier spacing or a specified CP length), the first wireless network device does not need to notify, by using the foregoing methods, the second wireless network device of the received signal set and the resource that can be occupied by the received signal set. UE may determine, by detecting a synchronization signal, a synchronization signal of a service that needs to be received, and an air interface feature corresponding to the service, and determine, by receiving a broadcast channel, a radio resource occupied by the service or the air interface feature, so as to receive a PDCCH (or a PHICH and a PDCCH) that is of the service or the air interface feature and that is sent by the base station, and receive data of the service.

S402. The second wireless network device receives the signal in the signal set on the resource that can be occupied by the received signal set, so as to obtain control information sent by a first wireless network device, where receiving processing includes at least one of determining search space, de-interleaving, demodulation, or descrambling.

After determining the resource that can be occupied by the received signal set, the second wireless network device receives the signal in the signal set on the resource that can be occupied by the received signal set, so as to obtain the control information sent by the first wireless network device.

The second wireless network device receives the PCFICH on a first symbol of the resource that can be occupied by the received signal set, the PCFICH in each signal set may be distributed on one frequency sub-band resource of the signal set, or may be distributed on multiple frequency sub-bands.

When the first wireless network device sends a PDFICH, a quantity of time domain symbols occupied by a PDCCH in a signal set is indicated by a PDFICH in the signal set, and the second wireless network device obtains, by receiving the PCFICH in each signal set, a quantity of time domain symbols occupied by a PDCCH in the signal set. When the first wireless network device sends no PCFICH, a quantity of time domain symbols occupied by a PDCCH in a signal set is indicated by a system broadcast message or an RRC message sent by the first wireless network device, or is a preset quantity of time domain symbols, and the second wireless network device obtains, by receiving the system broadcast message or the RRC message, a quantity of time domain symbols occupied by a PDCCH in each signal set.

The second wireless network device receives the PDCCH on the resource that can be occupied by the received signal set, and may perform processing such as at least one of determining search space, de-interleaving, demodulation, or descrambling on the received PDCCH. For example, the first wireless network device determines search space of the received signal set, and performs PDCCH detection on the received signal set according to the search space, which includes operations such as de-interleaving, demodulation, and descrambling, so as to obtain the control information sent by the first wireless network device.

It may be learned that in the technical solution provided in this embodiment of the present disclosure, the second wireless network device determines the resource that can be occupied by the received signal set, and receives the signal in the signal set on the resource that can be occupied by the received signal set, so as to obtain a control channel sent by the first wireless network device. The resource that can be occupied by the received signal set is lower than the system bandwidth in the frequency domain, and the received signal set and another signal set are transmitted separately, so as to cancel interference between signal sets, improve PDCCH (or PCFICH and PDCCH) transmission reliability, and reduce complexity of detecting a signal by the second wireless network device. In addition, in the technical solution provided in this embodiment of the present disclosure, a problem of transmitting a PDCCH (or a PDCCH and a PHICH) when different services are transmitted on a same carrier in the communications system (different air interface features may be used for different services), and each signal set is corresponding to one type of service or one type of air interface feature may be further resolved.

Embodiment 5 of the present disclosure provides a physical downlink control channel transmission method, and the method is applied to a second wireless network device. FIG. 7 is a schematic flowchart of the physical downlink control channel transmission method according to Embodiment 5 of the present disclosure. As shown in FIG. 7, the method may include the following steps.

S501. The second wireless network device performs de-interleaving, demodulation, and bit descrambling on a PDCCH received on a resource that can be occupied by a received signal set.

After obtaining the resource that can be occupied by the received signal set, the second wireless network device may receive the PDCCH on the resource that can be occupied by the received signal set. A first wireless network device maps a PDCCH symbol of a signal set first in a time domain and then in a frequency domain. Therefore, the second wireless network device also receives the PDCCH symbol according to a similar rule. That is, the second wireless network device receives the PDCCH symbol first from a time domain REG and then from a frequency domain REG on the resource that can be occupied by the received signal set. K symbols received from each REG are a symbol pair. K is a quantity of REs occupied by the REG.

The second wireless network device de-interleaves and demodulates a received PDCCH symbol pair sequence, so as to obtain a PDCCH bit sequence, and then performs bit descrambling on the PDCCH bit sequence. Specifically, the second wireless network device descrambles the PDCCH bit sequence by using a descrambling sequence of the received signal set, and a descrambled PDCCH bit sequence may be expressed as: b(i)=(b(i)+c(i))mod 2. b(i) is a bit sequence used prior to descrambling. A descrambling sequence c(i) is initialized to $$c_{init} = \lfloor n_s/2 \rfloor 2^w + N_{ID}^{cell} \cdot N_{beamsum} + N_{ID}^{beam}.$$

$$w = \lceil \log_2(N_{ID}^{cell} \cdot N_{beamsum}) \rceil,$$

$n_s$ is a timeslot number, $N_{ID}^{cell}$ is a physical cell identifier, $N_{beamsum}$ is a quantity of signal sets (indicated by a base station), and $N_{ID}^{beam}$ is an identifier of the received signal set.

S502. The second wireless network device performs PDCCH detection according to search space of the received signal set, to obtain control information sent by a first wireless network device.

The second wireless network device may first determine the search space of the received signal set before receiving a PDCCH in the received signal set. Search space of a PDCCH that is in each signal set and that is sent by the first wireless network device is independent of each other, and a CCE occupied by the PDCCH in each signal set is independently numbered. Search space of a signal set at a CCE aggregation level L is defined according to a candidate PDCCH set in the signal set, and the candidate PDCCH set in the signal set is determined according to a CCE number of the signal set.

Search space of a received signal set j at the CCE aggregation level L is:

$$L\{(Y_k + m') \bmod \lfloor N_{CCE,k}^{Bj}/L \rfloor\} + i, \text{ and}$$

$$L\{(Y_k + m') \bmod \lfloor N_{CCE,k}^{Bj}/L \rfloor\}$$

represents a start CCE number of each candidate PDCCH, where i=0, . . . , and L−1, $N_{CCE,k}^{Bj}$ is a total quantity of CCEs of a resource that can be occupied by the signal set j in a subframe k, the aggregation level L is a positive integer, for example, L∈{1,2,4,8, . . . }, m'=m+$M^{(L)}$·$n_a$, and $n_{CI}$ is a value in a carrier indicator field, or if no carrier indicator field is configured, m'm, m=0, . . . , and $M^{(L)}$−1, and $M^{(L)}$ is a quantity of candidate PDCCHs in the search space at the CCE aggregation level L. For common search space, $Y_k$=0; for second wireless network device-specific search space at the aggregation level L, $Y_k$ is defined as: $Y_k$=(A·$Y_{k-1}$)mod D. A and D are random integer coefficients (for example, A and D may be values in an existing protocol, for example, A=39827, and D=65537), $Y_{-1}$=$n_{RNTI}$≠0, and $n_{RNTI}$ is a radio network temporary identifier. A candidate PDCCH detected by the second wireless network device may be shown in the following table, or may have another definition according to an actual situation:

| Search space $S_k^{(L)}$ | | | Number of |
|---|---|---|---|
| Type | Aggregation level L | Size [in CCEs] | PDCCH candidates $M^{(L)}$ |
| UE-specific | 1 | 6 | 6 |
| UE-specific | 2 | 12 | 6 |
| | 4 | 8 | 2 |
| | 8 | 16 | 2 |
| Common | 4 | 16 | 4 |
| Common | 8 | 16 | 2 |

The second wireless network device detects the PDCCH in the received signal set according to the search space of the received signal set, which includes operations such as de-interleaving, demodulation, and descrambling. The second wireless network device may sequentially detect search space at all CCE aggregation levels. When detection succeeds, the control information sent by the first wireless network device may be obtained.

It may be learned that in the technical solution provided in this embodiment of the present disclosure, the second wireless network device can de-interleave, demodulate, and descramble the PDCCH received on the resource that can be occupied by the received signal set, and perform PDCCH detection according to the search space of the received signal set, so as to obtain the control information sent by the first wireless network device. The resource that can be occupied by the received signal set is lower than system bandwidth in the frequency domain, and the received signal set and another signal set are transmitted separately, so as to cancel interference between signal sets, improve PDCCH transmission reliability, and reduce complexity of detecting a signal by the second wireless network device. In addition, in the technical solution provided in this embodiment of the present disclosure, a problem of transmitting a PDCCH (or a PDCCH and a PHICH) when different services are transmitted on a same carrier in a communications system, different air interface features may be used for different services, and each signal set is corresponding to one type of service or one type of air interface feature may be further resolved.

Figure 8:
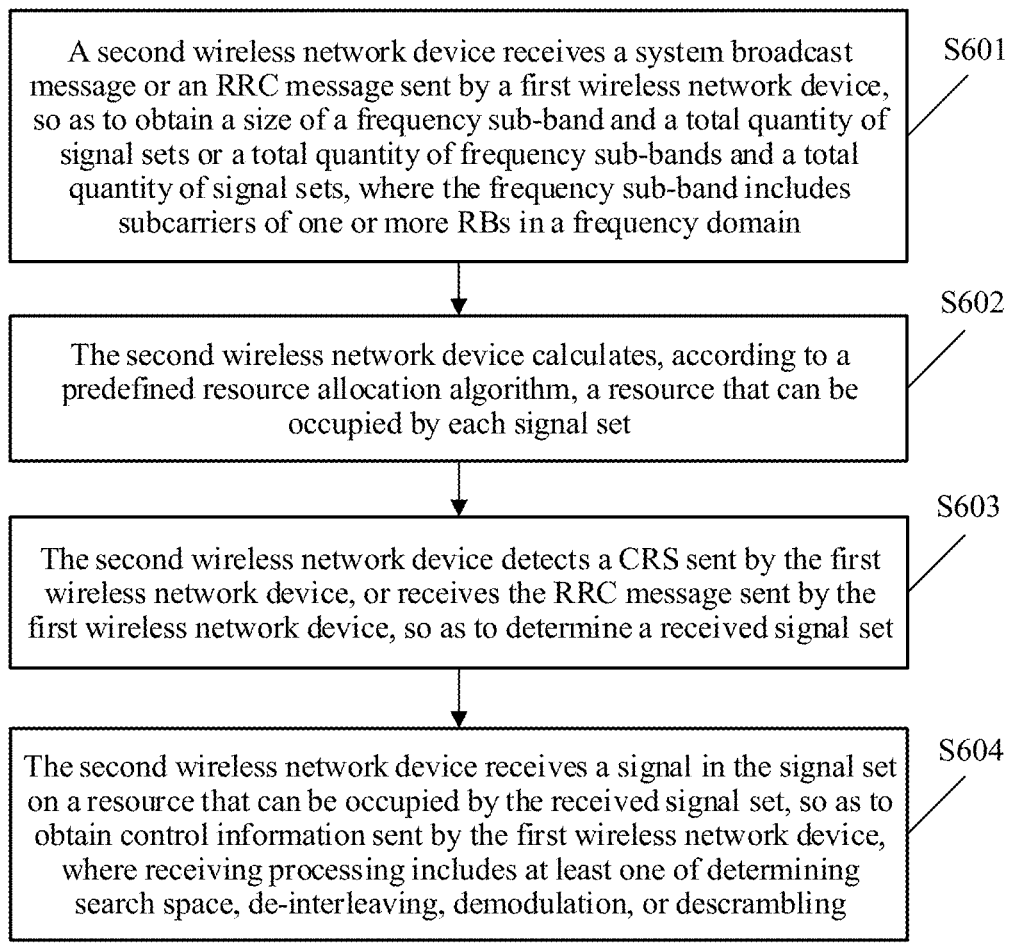
FIG. 8 is a schematic flowchart of a physical downlink control channel transmission method according to Embodiment 6 of the present disclosure.

Embodiment 6 of the present disclosure provides a physical downlink control channel transmission method, and the method is applied to a second wireless network device. Referring to FIG. 8, FIG. 8 is a schematic flowchart of the method provided in Embodiment 6 of the present disclosure. As shown in FIG. 8, the method provided in Embodiment 6 of the present disclosure may include the following steps.

S601. The second wireless network device receives a system broadcast message or an RRC message sent by a first wireless network device, so as to obtain a size of a frequency sub-band and a total quantity of signal sets or a total quantity of frequency sub-bands and a total quantity of signal sets, where the frequency sub-band includes subcarriers of one or more RBs in a frequency domain.

In the technical solution provided in this embodiment of the present disclosure, in order that the second wireless network device obtains, by means of calculation according to a predefined resource allocation algorithm, a resource that can be occupied by a received signal set, the first wireless network device notifies, by using the system broadcast message or the RRC message, the second wireless network device of the size of the frequency sub-band or the total quantity of frequency sub-bands and the total quantity of signal sets. The second wireless network device may obtain, according to the size of the frequency sub-band (or the total quantity of frequency sub-bands) and the total quantity of signal sets by using the predefined allocation algorithm, a resource that can be occupied by each signal set, and then obtain, according to the determined received signal set, the resource that can be occupied by the received signal set.

S602. The second wireless network device calculates, according to a predefined resource allocation algorithm, a resource that can be occupied by each signal set.

After obtaining the size of the frequency sub-band (or the total quantity of frequency sub-bands) and the total quantity of signal sets, the second wireless network device may calculate, by using the predefined resource allocation algorithm, a frequency sub-band occupied by each signal set. For example, a predefined frequency sub-band allocation algorithm is as follows: A quantity of RBs on each frequency sub-band is represented by $S_{BW}$, a total quantity of frequency sub-bands into which downlink system bandwidth may be divided is: $\lceil N_{RB}^{DL}/S_{BW} \rceil$, and the frequency sub-bands are numbered as $S_i$ in ascending order or in descending order of frequencies. $N_{RB}^{DL}$ is downlink system bandwidth, and a value of $S_i$ ranges from 0 to $(\lceil N_{RB}^{DL}/S_{BW} \rceil - 1)$ (including 0 and $(\lceil N_{RB}^{DL}/S_{BW} \rceil - 1)$). If a total quantity $S_N$ of frequency sub-bands is sent by the first wireless network device, it is calculated, according to $S_N$, that a size of each frequency sub-band is $\lceil N_{RB}^{DL}/S_N \rceil$, and the frequency sub-bands are numbered as $S_i$ in ascending order or in descending order of frequencies. A value of $S_i$ ranges from 0 to $(S_N-1)$. If a base station allocates same frequency sub-bands of all time domain symbols to a same signal set, an identifier, of a signal set, of a frequency sub-band $S_i$ on each time domain symbol may be represented by $S_i N_{beamsum}$. $N_{beamnum}$ is a quantity of sent signal sets. Assuming that $N_{beamnum}$ is 5, and a total quantity of frequency sub-bands is 10, a calculation result is shown in FIG. 3-$a$. If a base station allocates same frequency sub-bands of all time domain symbols to different signal sets, an identifier, of a signal set, of a frequency sub-band $S_i$ on a time domain symbol $l_i$ may be obtained by means of calculation according to a formula $(S_i+l_i) \bmod N_{beamsum}$. $l_i$ is a time domain symbol number. Assuming that $N_{beamnum}$ is 5, and a total quantity of frequency sub-bands is 10, a calculation result is shown in FIG. 3-$b$. It may be learned that the second wireless network device may calculate, according to the foregoing algorithm, a frequency sub-band that can be occupied by each signal set. The resource that can be occupied by the received signal set is distributed within system bandwidth and a time domain symbol occupied by a PDCCH in the signal set. The second wireless network device may obtain, according to the foregoing algorithm, a frequency sub-band that can be occupied on each time domain symbol of a signal set.

S603. The second wireless network device detects a CRS sent by the first wireless network device, or receives the RRC message sent by the first wireless network device, so as to determine a received signal set.

After determining a resource that can be occupied by each signal set, the second wireless network device needs to determine the received signal set to determine the resource that can be occupied by the received signal set.

In some feasible implementations, a resource location of the CRS or a sequence of the CRS sent by the first wireless network device on a resource that can be occupied by each signal set is related to an identifier of the signal set, and the second wireless network device may determine the received signal set by detecting the CRS.

For example, the resource location of the CRS sent by the first wireless network device is related to an identifier of a signal set, and the second wireless network device may learn of, by detecting a location of the CRS, an identifier of a signal set that occupies a resource for sending the CRS. The second wireless network device may determine, as an identifier of the received signal set, an identifier that is of a signal set and that is detected on a resource on which quality of receiving the CRS is highest.

For another example, the sequence of the CRS sent by the first wireless network device is related to an identifier of a signal set, and the second wireless network device may learn of, by detecting the sequence of the CRS, an identifier of a signal set that occupies a resource for sending the CRS. In specific implementation, the first wireless network device initializes a pseudorandom sequence generator of the sequence of the CRS sent on a resource that can be occupied by each signal set to:

$c_{init}=2^{10} \cdot (7 \cdot (n_s+1)+l+1) \cdot (2 \cdot N_{ID}^{new}+1)+2 \cdot N_{ID}^{new}+N_{CP}$, where $N_{ID}^{new}$ includes a physical cell identifier and an identifier of a signal set. When a normal cyclic prefix CP is used, $N_{CP}$ is 1. When an extended CP is used, $N_{CP}$ is 0. When detecting the CRS, the second wireless network device calculates the value $c_{init}$ of the foregoing pseudorandom sequence initialization formula by using a detected sequence of the CRS, and calculates $N_{ID}^{new}$ by using the value of the formula, so as to obtain the identifier of the signal set by means of calculation according to a relationship among $N_{ID}^{new}$, the physical cell identifier, and the identifier of the signal set. The second wireless network device may determine, as an identifier of the received signal set, an identifier that is of a signal set and that is detected on a resource on which quality of receiving the CRS is highest.

In some other feasible embodiments, the second wireless network device obtains an identifier of the received signal set by using an RRC message sent by the first wireless network device.

S604. The second wireless network device receives a signal in a signal set on a resource that can be occupied by the received signal set, so as to obtain control information sent by the first wireless network device, where receiving processing includes at least one of determining search space, de-interleaving, demodulation, or descrambling.

After determining the resource that can be occupied by the received signal set, the second wireless network device receives the signal in the signal set on the resource that can be occupied by the received signal set, so as to obtain the control information sent by the first wireless network device. For specific implementation of this step, refer to step S402 in Embodiment 4 of the present disclosure. This is not described again.

It may be learned that in the technical solution disclosed in this embodiment of the present disclosure, the second wireless network device calculates, by using the predefined resource allocation algorithm, the resource that can be occupied by each signal set, and determines, according to the identifier of the received signal set, the resource that can be occupied by the received signal set, so as to receive a signal in the received signal set to obtain a control channel sent by the first wireless network device. The resource that can be occupied by the received signal set is lower than the system bandwidth in the frequency domain, and the received signal set and another signal set are transmitted separately, so as to cancel interference between signal sets sent by using a narrow-band beam, improve PDCCH (or PCFICH and PDCCH) transmission reliability, and reduce complexity of detecting a signal by the second wireless network device.

Figure 9:
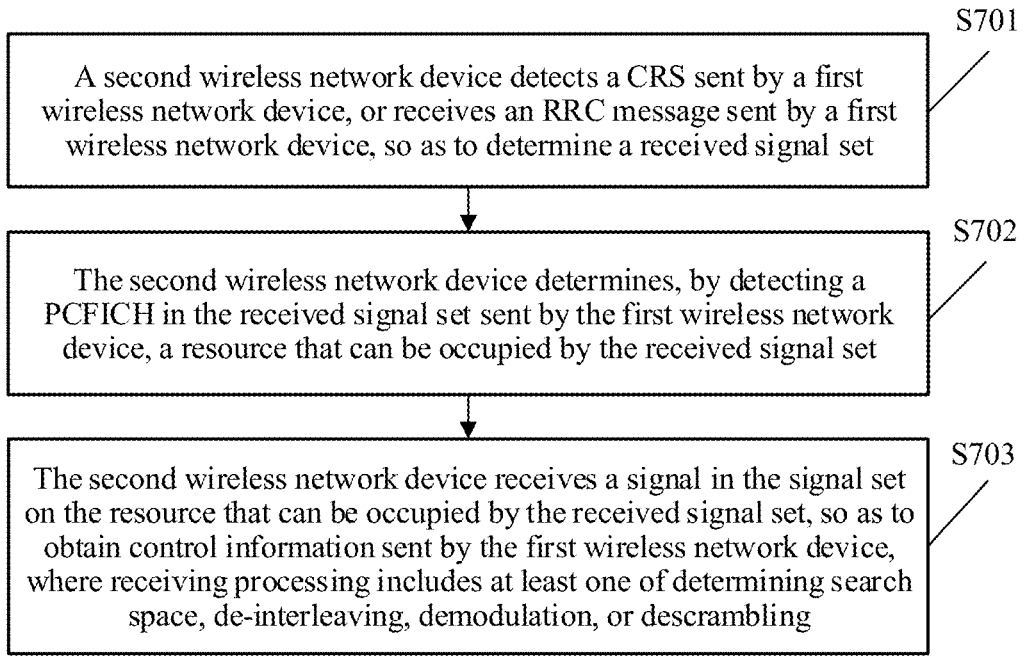
FIG. 9 is a schematic flowchart of a physical downlink control channel transmission method according to Embodiment 7 of the present disclosure.

Embodiment 7 of the present disclosure provides a physical downlink control channel transmission method, and the method is applied to a second wireless network device. Referring to FIG. 9, FIG. 9 is a schematic flowchart of the method provided in Embodiment 7 of the present disclosure. As shown in FIG. 9, the method provided in Embodiment 7 of the present disclosure may include the following steps.

S701. The second wireless network device detects a CRS sent by a first wireless network device, or receives an RRC message sent by a first wireless network device, so as to determine a received signal set.

In the technical solution disclosed in this embodiment of the present disclosure, the second wireless network device may determine, by detecting a PCFICH in a received signal set sent by the first wireless network device, a resource that can be occupied by the received signal set. A REG location of the PCFICH in the signal set is related to an identifier of the received signal set. Therefore, the second wireless network device may first determine the identifier of the received signal set, so as to determine the resource that can be occupied by the received signal set.

For specific implementation of detecting the CRS sent by the first wireless network device, so as to determine the received signal set, refer to step S603 in Embodiment 6 of the present disclosure. This is not described again.

S702. The second wireless network device determines, by detecting a PCFICH in the received signal set sent by the first wireless network device, a resource that can be occupied by the received signal set.

After determining the identifier of the received signal set, the second wireless network device may receive the PCFICH in the received signal set according to the identifier of the signal set. The second wireless network device may determine, by using the PCFICH, the resource that can be occupied by the received signal set, and may further obtain, by using a CFI in the PCFICH, a quantity of time domain symbols occupied by a PDCCH in the received signal set.

In specific implementation, if a total quantity of frequency sub-bands included in downlink system bandwidth is M, a PCFICH in each signal set may carry M pieces of bit information to indicate a frequency sub-band occupied by the signal set. Each bit is corresponding to one frequency sub-band. That a bit value is 1 represents that a signal set occupies the frequency sub-band, and a bit 0 represents that no signal set occupies the frequency sub-band. The first wireless network device may jointly encode the M pieces of bit information and the CFI information of the PCFICH, and obtain K·Q·C pieces of bit information after encoding and scramble the K·Q·C pieces of bit information, or may scramble, by using the M pieces of bit information, K·Q·C bits obtained after encoding the CFI information. K is a quantity of REs occupied by a REG, Q is a modulation order, and C is a quantity of REGs occupied by the PCFICH in the signal set. After scrambling, the K·Q·C bits are modulated to K·C modulation symbols, and the K·C modulation symbols are mapped to C REGs in a first time domain symbol of each radio subframe. When receiving the PCFICH, the second wireless network device may obtain the M pieces of bit information in a corresponding process such as descrambling or decoding. The resource that can be occupied by the received signal set is distributed within system bandwidth and a time domain symbol occupied by the PDCCH in the signal set. If the received signal set occupies a same frequency sub-band on each time domain symbol that can be occupied, the second wireless network device may obtain, by using the foregoing method, the resource that can be occupied by the received signal set.

S703. The second wireless network device receives a signal in the signal set on the resource that can be occupied by the received signal set, so as to obtain control information sent by the first wireless network device, where receiving processing includes at least one of determining search space, de-interleaving, demodulation, or descrambling.

After determining the resource that can be occupied by the received signal set, the second wireless network device receives the signal in the signal set on the resource that can be occupied by the received signal set, so as to obtain the control information sent by the first wireless network device. For specific implementation of this step, refer to step S402 in Embodiment 4 of the present disclosure. This is not described again.

It may be learned that in the technical solution disclosed in this embodiment of the present disclosure, the second wireless network device determines, by detecting the PCFICH in the received signal set sent by the first wireless network device, the resource that can be occupied by the received signal set, so as to receive the signal in the received signal set, and obtain a control channel sent by the first wireless network device. The resource that can be occupied by the received signal set is lower than the system bandwidth in a frequency domain, and the received signal set and another signal set are transmitted separately, so as to cancel interference between signal sets sent by using a narrow-band beam, improve PDCCH (or PCFICH and PDCCH) transmission reliability, and reduce complexity of detecting a signal by the second wireless network device.

Figure 10:
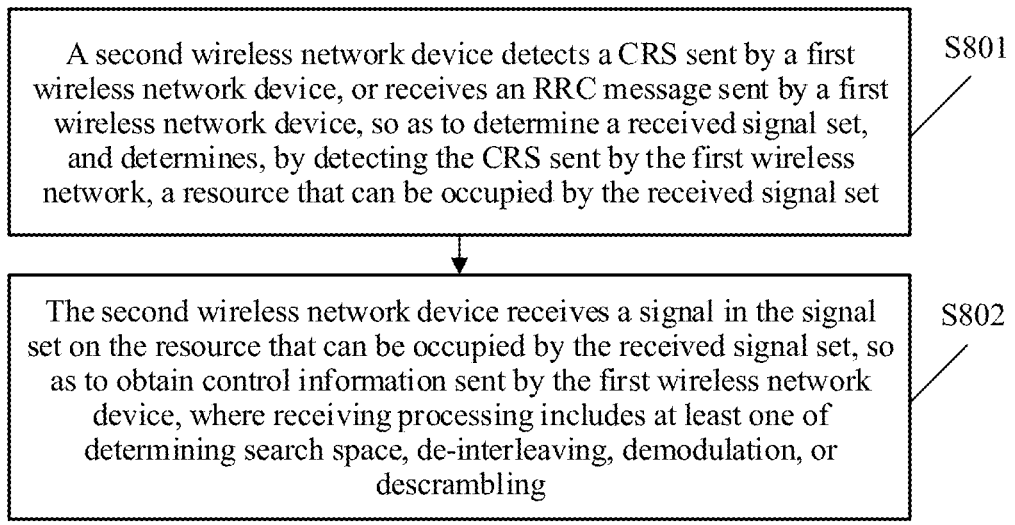
FIG. 10 is a schematic flowchart of a physical downlink control channel transmission method according to Embodiment 8 of the present disclosure.

Embodiment 8 of the present disclosure provides a physical downlink control channel transmission method, and the method is applied to a second wireless network device. Referring to FIG. 10, FIG. 10 is a schematic flowchart of the method provided in Embodiment 8 of the present disclosure. As shown in FIG. 10, the method provided in Embodiment 8 of the present disclosure may include the following steps.

S801. The second wireless network device detects a CRS sent by a first wireless network device, or receives an RRC message sent by a first wireless network device, so as to determine a received signal set, and determines, by detecting the CRS sent by the first wireless network device, a resource that can be occupied by the received signal set.

To receive a signal in the signal set on the resource that can be occupied by the received signal set, so as to obtain control information sent by the first wireless network device, in specific implementation, the second wireless network device determines an identifier of the received signal set, and then determines the resource that can be occupied by the received signal set.

The second wireless network device may directly determine, by detecting the CRS, the received signal set and the resource that can be occupied by the received signal set. The second wireless network device may detect the CRS within system bandwidth and a time domain symbol occupied by a PDCCH in the received signal set, so as to determine the received signal set and the resource that can be occupied by the received signal set. For specific implementation of detecting the CRS sent by the first wireless network device, so as to determine the received signal set, refer to step S603 in Embodiment 6 of the present disclosure. This is not described again. A resource location of a CRS or a sequence of a CRS sent by the first wireless network device on a resource that can be occupied by each signal set is related to an identifier of the signal set. The second wireless network device may determine, by detecting the resource location of the CRS or the sequence of the CRS, an identifier of a signal set that occupies a resource for sending the CRS. After determining the identifier of the received signal set, the second wireless network device may use, as the resource that can be occupied by the received signal set, a resource on which the identifier of the received signal set is detected in the resource for sending the CRS.

S802. The second wireless network device receives a signal in the signal set on the resource that can be occupied by the received signal set, so as to obtain control information sent by the first wireless network device, where receiving processing includes at least one of determining search space, de-interleaving, demodulation, or descrambling.

After determining the resource that can be occupied by the received signal set, the second wireless network device receives the signal in the signal set on the resource that can be occupied by the received signal set, so as to obtain the control information sent by the first wireless network device. For specific implementation of this step, refer to step S402 in Embodiment 4 of the present disclosure. This is not described again.

It may be learned that in the technical solution provided in this embodiment of the present disclosure, the second wireless network device determines, by detecting the CRS, the resource that can be occupied by the received signal set, and receives the signal in the signal set on the resource that can be occupied by the received signal set, so as to obtain the control information sent by the first wireless network device. The resource that can be occupied by the received signal set is lower than the system bandwidth in a frequency domain, and the received signal set and another signal set are transmitted separately, so as to cancel interference between signal sets sent by using a narrow-band beam, improve PDCCH (or PCFICH and PDCCH) transmission reliability, and reduce complexity of detecting a signal by the second wireless network device.

Figure 11A:
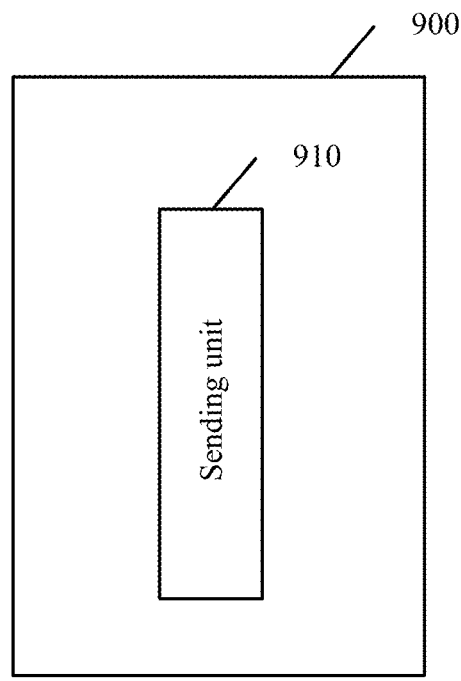
FIG. 11*a* or FIG. 11*b* is a schematic structural diagram of a wireless network device according to Embodiment 9 of the present disclosure.
Figure 11B:
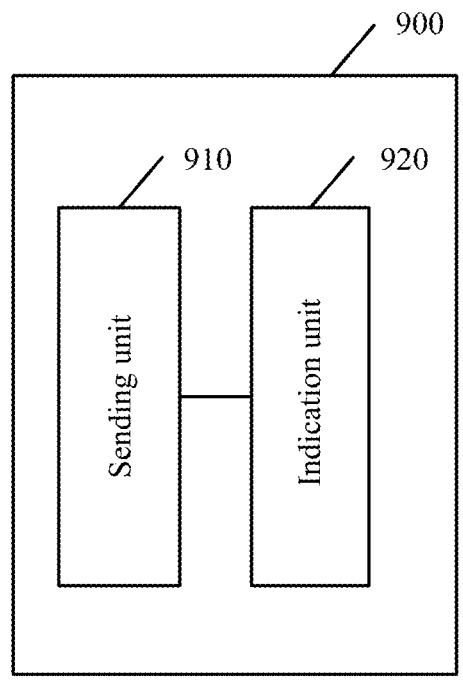

Embodiment 9 of the present disclosure provides a wireless network device, configured to send N signal sets. Each signal set is used to transmit control information of one or more second wireless network devices, N is an integer greater than 2, and a signal in the signal set includes a PDCCH or a PDCCH and a PCFICH. Referring to FIG. 11a and FIG. 11b, the wireless network device 900 may include a sending unit 910.

The sending unit 910 is configured to send each signal set to the second wireless network device on a resource that can be occupied by the signal set, where the sending unit performs sending processing on a signal in each signal set, and the sending processing includes at least one of multiplexing, scrambling, modulation, interleaving, or resource mapping.

In some feasible embodiments, the sending unit 910 is specifically configured to send a PDCCH in the signal set to the second wireless network device by using the resource that can be occupied by the signal set. A quantity of time domain symbols occupied by the PDCCH in the signal set is a quantity of time domain symbols notified by the first wireless network device to the second wireless network device by using a system broadcast message or an RRC message, or is a preset quantity of time domain symbols.

In some other feasible implementations, the sending unit 910 is specifically configured to send a PCFICH in each signal set to the second wireless network device by using a first time domain symbol of the resource that can be occupied by the signal set, where the PCFICH is used to indicate a quantity of time domain symbols occupied by the PDCCH in the signal set; and is further configured to send the PDCCH in the signal set to the second wireless network device by using the resource that can be occupied by the signal set, where a quantity of time domain symbols occupied by the PDCCH in the signal set is a quantity of time domain symbols indicated by the PCFICH in the signal set.

In specific implementation, a CCE that can be occupied by each signal set is independently numbered, search space of the signal set at a CCE aggregation level L is defined according to a candidate PDCCH set in the signal set, and the candidate PDCCH set in the signal set is determined according to a CCE number of the signal set. The CCE search space of the signal set at the CCE aggregation level L is expressed as:

$L\{(Y_k+m') \bmod \lfloor N_{CCE,k}^{H_j}/L \rfloor\}+i$, where $i=0, \ldots,$ and $L-1$, $N_{CCE,k}^{B_j}$ is a total quantity of CCEs of a resource that can be occupied by a signal set j in a subframe k, the aggregation level L is a positive integer, $m'=m+M^{(L)} \cdot n_a$, and $n_{CI}$ is a value in a carrier indicator field, or if no carrier indicator field is configured, $m'=m$, $m=0, \ldots,$ and $M^{(L)}-1$, and $M^{(L)}$ is a quantity of candidate PDCCHs in the search space at the CCE aggregation level L. For common search space, $Y_k=0$; for second wireless network device-specific search space at the aggregation level L, $Y_k$ is defined as: $Y_k=(A \cdot Y_{k-1}) \bmod D$, A and D are integer coefficients, $Y_{-1}=n^{RNTI} \neq 0$, and is a radio network temporary identifier.

In specific implementation, the sending unit 910 multiplexes a PDCCH bit of each signal set, to obtain a PDCCH bit sequence of each signal set, and the PDCCH bit sequence of each signal set is expressed as:

$$b^{B_i \chi(0)}(0), \ldots, b^{B_i \chi(0)}(M_{bit}^{(B_i)(0)}-1), \ldots ,$$
$$b^{(B_i \chi n_{PDCCH}^{B_i}-1)}(0), b^{(B_i \chi n_{PDCCH}^{B_i}-1)}\left(M_{bit}^{(B_i)(n_{PDCCH}^{B_i}-1)}-1\right),$$

where $M_{bit}^{(B_i)(j)}$ is a quantity of bits occupied by a $j^{th}$ PDCCH in a signal set i, $j=0, 1, \ldots,$ and $n_{PDCCH}^{B_i}-1$, and $n_{PDCCH}^{B_i}$ is a quantity of PDCCHs in the signal set i.

In specific implementation, the sending unit 910 scrambles a PDCCH bit sequence of each signal set, so as to obtain a scrambled bit sequence, and the scrambled bit sequence is expressed as:

$\tilde{b}(i)=(b(i)+c(i)) \bmod 2$, where b(i) is the PDCCH bit sequence used before scrambling, a scrambled sequence c(i) is initialized to $$c_{init} = \lfloor n_s/2 \rfloor 2^w + N_{ID}^{cell} \cdot N_{beamsum} + N_{ID}^{beam}, \, w = \lceil \log_2(N_{ID}^{cell} \cdot N_{beamsum}) \rceil,$$

$n_s$ is a timeslot number, $N_{ID}^{cell}$ is a physical cell identifier, $N_{beamsum}$ is a quantity of signal sets, and $N_{ID}^{beam}$ is an identifier of a signal set.

In specific implementation, the sending unit 910 sends the PCFICH to the second wireless network device by using four REGs in a first time domain symbol of the resource that can be occupied by each signal set. If the REGs are distributed on one frequency sub-band occupied by the signal set, one frequency sub-band includes subcarriers of one or more resource blocks RBs, and subcarrier locations of the REGs are expressed as:

a subcarrier location of a first REG is:

$$k = k_{start}^{Bi} + \overline{k};$$

a subcarrier location of a second REG is:

$$k = (k_{start}^{Bi} + \overline{k} + \lfloor N_{RB}^{subband}/2 \rfloor \cdot N_{sc}^{RB}/2) \bmod N_{RB}^{subband} N_{sc}^{RB};$$

a subcarrier location of a third REG is:

$$k = (k_{start}^{Bi} + \overline{k} + \lfloor 2 N_{RB}^{subband}/2 \rfloor \cdot N_{sc}^{RB}/2) \bmod N_{RB}^{subband} N_{sc}^{RB}; \text{ and}$$

a subcarrier location of a fourth REG is:

$$k = (k_{start}^{Bi} + \overline{k} + \lfloor 3 N_{RB}^{subband}/2 \rfloor \cdot N_{sc}^{RB}/2) \bmod N_{RB}^{subband} N_{sc}^{RB}; \text{ where}$$

$\overline{k} = (N_{sc}^{RB}/2) \cdot (N_{ID}^{cell} \bmod 2 N_{RB}^{subband})$, $N_{ID}^{cell}$ is a physical cell identifier, $k_{start}^{Bi}$ is a start subcarrier location offset of a PCFICH in the signal set i, $N_{RB}^{subband}$ is a quantity of resource blocks RBs included in the frequency sub-band, and $N_{sc}^{RB}$ is a quantity of subcarriers included in one RB.

In specific implementation, to notify the second wireless network device of a received signal set and a resource that can be occupied by the received signal set, the wireless network device 900 may further include an indication unit 920.

The indication unit 920 is configured to send a CRS, where a resource location of the CRS or a sequence of the CRS is used to notify the second wireless network device of the received signal set, or is configured to send an RRC message to notify the second wireless network device of the received signal set.

The indication unit 920 is further configured to send a size of a frequency sub-band and a total quantity of signal sets or a total quantity of frequency sub-bands and a total quantity of signal sets to the second wireless network device, where the size of the frequency sub-band and the total quantity of signal sets or the total quantity of frequency sub-bands and the total quantity of signal sets are used by the second wireless network device to calculate, according to a predefined resource allocation algorithm, the resource that can be occupied by the received signal set, and one frequency sub-band includes subcarriers of one or more RBs in a frequency domain; or is further configured to send a CRS, where a resource location of the CRS or a sequence of the CRS is used by the second wireless network device to determine the resource that can be occupied by the received signal set; or is further configured to send a PCFICH to notify the second wireless network device of the resource that can be occupied by the received signal set; or is further configured to send an RRC message to the second wireless network device to notify the second wireless network device of the resource that can be occupied by the received signal set.

The indication unit 920 notifies, by using M pieces of bit information included in the PCFICH in the signal set, the second wireless network device of the resource that can be occupied by the received signal set. M is the total quantity of frequency sub-bands, and each bit in the M pieces of bit information indicates whether one frequency sub-band belongs to the resource that can be occupied by the signal set.

It should be noted that if the wireless network device 900 is applied to a wireless communications system in which each service occupies a specified radio resource, and transmission is performed by using a specified air interface feature (for example, a specified subcarrier spacing and/or a specified CP length), the indication unit 920 may not notify, by using the foregoing methods, the second wireless network device of the received signal set and the resource that can be occupied by the received signal set. In this case, the indication unit 920 is configured to send a synchronization signal to the second wireless network device. The synchronization signal is used by the second wireless network device to determine a synchronization signal of a service that needs to be received, and the indication unit 920 may be further configured to send the system broadcast message to notify the second wireless network device of a radio resource occupied by the service or an air interface feature corresponding to the service.

It may be learned that in the technical solution disclosed in this embodiment of the present disclosure, interference between signal sets sent by using a narrow beam may be canceled, PDCCH (or PCFICH and PDCCH) transmission reliability may be improved, and the second wireless network device receives a PDCCH (or a PCFICH and a PDCCH) on the resource that can be occupied by the received signal set, so as to reduce complexity of detecting a signal by the second wireless network device. In addition, in the technical solution provided in this embodiment of the present disclosure, a problem of transmitting a PDCCH (or a PDCCH and a PHICH) when different services are transmitted on a same carrier (different air interface features are used for different services) in the communications system, and each signal set is corresponding to one type of service or one type of air interface feature may be further resolved.

Figure 12:
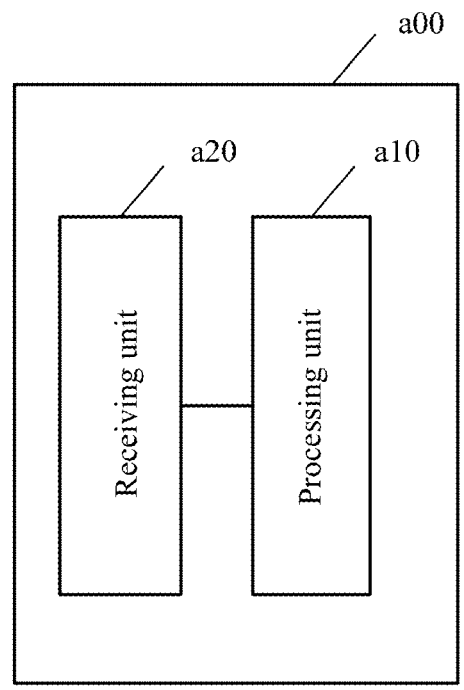
FIG. 12 is a schematic structural diagram of another wireless network device according to Embodiment 10 of the present disclosure.

Embodiment 10 of the present disclosure provides a wireless network device, to implement a physical downlink control channel transmission method disclosed in the embodiments of the present disclosure, that is, to obtain control information from a first wireless network device. Referring to FIG. 12, the wireless network device a00 may include a processing unit a10 and a receiving unit a20.

The processing unit a10 is configured to determine a resource that can be occupied by a received signal set. The signal set may include a PDCCH or a PDCCH and a PCFICH, and the resource that can be occupied by the signal set is lower than system bandwidth in a frequency domain.

The receiving unit a20 is configured to receive a signal in the signal set on the resource that can be occupied by the received signal set, so as to obtain control information sent by the first wireless network device, where receiving processing includes at least one of determining search space, de-interleaving, demodulation, or descrambling.

In some feasible implementations, the receiving unit a20 is specifically configured to receive the PDCCH in the signal set on the resource that can be occupied by the received signal set, so as to obtain the control information sent by the first wireless network device. A quantity of time domain symbols occupied by the PDCCH in the received signal set is a quantity that is of time domain symbols occupied by the signal set and that is indicated in a system broadcast message or an RRC message sent by the first wireless network device, or is a preset quantity of time domain symbols.

In some other feasible implementations, the receiving unit a20 is specifically configured to receive the PCFICH in the signal set on a first time domain symbol of the resource that can be occupied by the received signal set; and is further specifically configured to receive the PDCCH in the signal set on the resource that can be occupied by the received signal set, so as to obtain the control information sent by the first wireless network device. A quantity of time domain symbols occupied by the PDCCH in the received signal set is a quantity of time domain symbols indicated by the PCFICH in the signal set.

In specific implementation, the processing unit a10 is configured to calculate, according to a size of a frequency sub-band and a total quantity of signal sets or according to a total quantity of frequency sub-bands and a total quantity of signal sets by using a predefined resource allocation algorithm, the resource that can be occupied by the received signal set, where one frequency sub-band includes subcarriers of one or more RBs in the frequency domain, and the size of the frequency sub-band and the total quantity of signal sets or the total quantity of frequency sub-bands and the total quantity of signal sets are obtained from the system broadcast message or the RRC message sent by the first wireless network device; or is specifically configured to determine, by detecting the PCFICH in the received signal set sent by the first wireless network device, the resource that can be occupied by the received signal set; or is specifically configured to detect a CRS sent by the first wireless network device, and determine, according to a resource location of the CRS or a sequence of the CRS, the resource that can be occupied by the received signal set; or is specifically configured to determine, by receiving the broadcast message or the RRC message sent by the first wireless network device, the resource that can be occupied by the received signal set.

It should be noted that if the wireless network device a00 is applied to a wireless communications system in which each service occupies a specified radio resource, and transmission is performed by using a specified air interface feature (for example, a specified subcarrier spacing and/or a specified CP length), the processing unit a20 does not need to determine, by using the foregoing methods, the received signal set and the resource that can be occupied by the received signal set. In this case, the processing unit a20 determines, by detecting a synchronization signal, a synchronization signal of a service that needs to be received, and determines, by receiving the broadcast channel sent by the first wireless network device, a radio resource occupied by the service or the air interface feature.

It may be learned that in the technical solution provided in this embodiment of the present disclosure, the wireless network device a00 determines the resource that can be occupied by the received signal set, and receives the signal in the signal set on the resource that can be occupied by the received signal set, so as to obtain a control channel sent by the first wireless network device. The resource that can be occupied by the received signal set is lower than the system bandwidth in the frequency domain, and the received signal set and another signal set are transmitted separately, so as to cancel interference between signal sets, improve PDCCH (or PCFICH and PDCCH) transmission reliability, and reduce complexity of detecting a signal by the second wireless network device. In addition, in the technical solution provided in this embodiment of the present disclosure, a problem of transmitting a PDCCH (or a PDCCH and a PHICH) when different services are transmitted on a same carrier in the communications system (different air interface features may be used for different services), and each signal set is corresponding to one type of service or one type of air interface feature may be further resolved.

Figure 13:
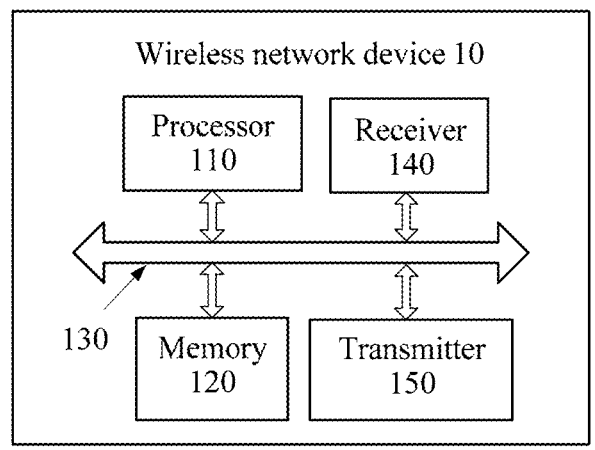
FIG. 13 is a schematic structural diagram of a wireless network device according to an embodiment of the present disclosure.

According to the methods provided in the embodiments of the present disclosure, as shown in FIG. 13, an embodiment of the present disclosure further provides a physical downlink control channel transmission apparatus, that is, a wireless network device 10. The wireless network device 10 is corresponding to the first wireless network device in the foregoing physical downlink control channel transmission method. The first wireless network device may be a base station, or may be another device.

The wireless network device 10 includes a processor 110, a memory 120, a bus system 130, a receiver 140, and a transmitter 150. The processor 110, the memory 120, the receiver 140, and the transmitter 150 are connected by using the bus system 130. The memory 120 is configured to store an instruction. The processor 110 is configured to: execute the instruction stored in the memory 120, so as to control the receiver 140 to receive a signal and control the transmitter 150 to send a signal; and complete steps in the foregoing physical downlink control channel transmission method. The receiver 140 and the transmitter 150 may be a same physical entity or different physical entities. When the receiver 140 and the transmitter 150 are a same physical entity, the receiver 140 and the transmitter 150 may be collectively referred to as a transceiver.

At least the following step may be included:

sending each signal set to a second wireless network device on a resource that can be occupied by the signal set, where the first wireless network device performs sending processing on a signal in each signal set, and the sending processing includes at least one of multiplexing, scrambling, modulation, interleaving, or resource mapping.

In an implementation, it may be considered that functions of the receiver 140 and the transmitter 150 are implemented by using a transceiver circuit or a dedicated transceiver chip. It may be considered that the processor 110 is implemented by using a dedicated processing chip, a processing circuit, a processor, or a general purpose chip.

In another implementation, it may be considered that the physical downlink control channel transmission apparatus provided in this embodiment of the present disclosure is implemented by using a general purpose computer. That is, program code for implementing functions of the processor 110, the receiver 140, and the transmitter 150 are stored in the memory, and the general purpose processor implements the functions of the processor 110, the receiver 140, and the transmitter 150 by executing the code in the memory.

For a concept, explanation, detailed description, and other steps that are related to the wireless network device 10 and related to the technical solution provided in this embodiment of the present disclosure, refer to description about the content in the foregoing method or in another embodiment. Details are not described herein.

Figure 14:
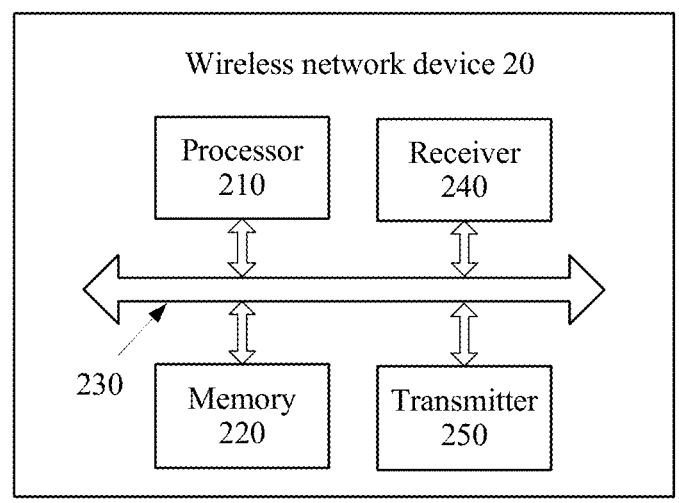
FIG. 14 is a schematic structural diagram of another wireless network device according to an embodiment of the present disclosure.

According to the methods provided in the embodiments of the present disclosure, as shown in FIG. 14, an embodiment of the present disclosure further provides another physical downlink control channel transmission apparatus, that is, a wireless network device 20. The wireless network device 20 is corresponding to the second wireless network device in the foregoing physical downlink control channel transmission method. The second wireless network device may be user equipment, or may be a micro base station, a small cell, or a relay.

The wireless network device includes a processor 210, a memory 220, a bus system 230, a receiver 240, and a transmitter 250. The processor 210, the memory 220, the receiver 240, and the transmitter 250 are connected by using the bus system 230. The memory 220 is configured to store an instruction. The processor 210 is configured to: execute the instruction stored in the memory 220, so as to control the receiver 240 to receive a signal and control the transmitter 250 to send a signal; and complete steps in the foregoing physical downlink control channel transmission method. The receiver 240 and the transmitter 250 may be a same physical entity or different physical entities. When the receiver 240 and the transmitter 250 are a same physical entity, the receiver 240 and the transmitter 250 may be collectively referred to as a transceiver.

At least the following steps may be included:

determining a resource that can be occupied by a received signal set, where a signal in the signal set includes a PDCCH or a PDCCH and a PCFICH, and the resource that can be occupied by the signal set is lower than system bandwidth in a frequency domain; and receiving the signal in the signal set on the resource that can be occupied by the received signal set, so as to obtain control information sent by a first wireless network device, where receiving processing includes at least one of determining search space, de-interleaving, demodulation, or descrambling.

In an implementation, it may be considered that functions of the receiver 240 and the transmitter 250 are implemented by using a transceiver circuit or a dedicated transceiver chip. It may be considered that the processor 210 is implemented by using a dedicated processing chip, a processing circuit, a processor, or a general purpose chip.

In another implementation, it may be considered that the physical downlink control channel transmission apparatus provided in this embodiment of the present disclosure is implemented by using a general purpose computer. That is, program code for implementing functions of the processor 210, the receiver 240, and the transmitter 250 are stored in the memory, and the general purpose processor implements the functions of the processor 210, the receiver 240, and the transmitter 250 by executing the code in the memory.

For a concept, explanation, detailed description, and other steps that are related to the wireless network device 20 and related to the technical solution provided in this embodiment of the present disclosure, refer to description about the content in the foregoing method or in another embodiment. Details are not described herein.

According to the methods provided in the embodiments of the present disclosure, an embodiment of the present disclosure further provides a communications system, including the first wireless network device and the one or more second wireless network devices described above.

It should be understood that in the embodiments of the present disclosure, the processor 110 or 210 may be a central processing unit (CPU), or the processor may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor, or the like.

The memory 120 or 220 may include a read-only memory and a random access memory, and provide an instruction and data for the processor 110 or 210. A part of the memory may further include a nonvolatile random access memory. For example, the memory may further store information about a device type.

In addition to a data bus, the bus system 130 or 230 may include a power bus, a control bus, a status signal bus, and the like. However, for clarity of description, various buses are marked as the bus system in the figure.

In an implementation process, steps of the foregoing methods may be completed by using an integrated logic circuit of hardware in the processor 110 or 210 or an instruction in a form of software. The steps of the methods disclosed with reference to the embodiments of the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information from the memory, and completes the steps in the foregoing methods in combination with the hardware in the processor. Details are not described again herein to avoid repetition.

It should be further understood that "first", "second", "third", "fourth", and various numbers are merely used for differentiation for ease of description, and are not construed as a limitation on the scope of the embodiments of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A physical downlink control channel transmission method for use by a terminal to obtain control information from a wireless network device, wherein the control information comprises common control information and/or dedicated control information, and the method comprises:
    determining a resource that can be occupied by a received signal set, wherein a signal in the received signal set comprises a physical downlink control channel (PDCCH) and a physical control format indicator channel (PCFICH), wherein the signal in the received signal set is transmitted using a narrow-band antenna beam, and wherein the resource that can be occupied by the signal set is lower than full system bandwidth in a frequency domain such that the PDCCH and the PCFICH are received by the terminal without occupying the full system bandwidth;
    receiving the signal in the signal set on the resource that can be occupied by the received signal set to obtain the control information from the wireless network device; and
    processing the signal, wherein processing the signal comprises at least one of determining search space in the signal, de-interleaving the signal, demodulating the signal, or descrambling the signal.

2. The method according to claim 1, wherein receiving the signal in the signal set on the resource that can be occupied by the received signal set to obtain the control information from the wireless network device comprises receiving the PDCCH in the signal set on the resource that can be occupied by the received signal set to obtain the control information from the wireless network device, and wherein a quantity of time domain symbols occupied by the PDCCH in the received signal set is one of:
    a quantity of time domain symbols occupied by the signal set and that is indicated in a system broadcast message or a radio resource control (RRC) message from the wireless network device; or
    a preset quantity of time domain symbols.

3. The method according to claim 1, wherein receiving the signal in the signal set on the resource that can be occupied by the received signal set to obtain the control information from the first wireless network device further comprises:
    receiving the PCFICH in the signal set on a first time domain symbol of the resource that can be occupied by the received signal set; and
    receiving the PDCCH in the signal set on the resource that can be occupied by the received signal set to obtain the control information from the wireless network device, wherein a quantity of time domain symbols occupied by the PDCCH in the received signal set is a quantity of time domain symbols indicated by the PCFICH in the signal set.

4. The method according to claim 1, wherein determining the resource that can be occupied by the received signal set comprises calculating, according to a size of a frequency sub-band and a total quantity of signal sets or according to a total quantity of frequency sub-bands and a total quantity of signal sets using a predefined resource allocation algorithm, the resource that can be occupied by the received signal set, wherein the frequency sub-band comprises sub-carriers of one or more resource blocks (RBs) in the frequency domain, and wherein the size of the frequency sub-band and the total quantity of signal sets or the total quantity of frequency sub-bands and the total quantity of signal sets are obtained from a system broadcast message or the RRC message from the wireless network device.

5. An apparatus, comprising:
    a transceiver;
    a processor coupled to the transceiver; and
    a memory coupled to the processor and configured to store instructions which, when executed by the processor, cause the apparatus to be configured to:
        determine a resource that can be occupied by a received signal set, wherein a signal in the signal set comprises a physical downlink control channel (PDCCH) and a physical control format indicator channel (PCFICH), wherein the signal in the received signal set is transmitted using a narrow-band antenna beam, and wherein the resource that can be occupied by the signal set is lower than full system bandwidth in a frequency domain such that the PDCCH and the PCFICH are transmitted to the apparatus without occupying the full system bandwidth;

receive the signal in the signal set on the resource that can be occupied by the received signal set to obtain control information from a wireless network device; and process the received signal, wherein processing the received signal comprises at least one of: determining search space in the received signal, de-interleaving the received signal, demodulating the received signal, or descrambling the received signal.

6. The apparatus according to claim 5, wherein to receive the signal in the signal set on the resource that can be occupied by the received signal set to obtain control information from the network device, the instructions further cause the apparatus to be configured to receive the PDCCH in the signal set on the resource that can be occupied by the received signal set to obtain control information from a wireless network device.

7. The apparatus according to claim 5, wherein to receive the signal in the signal set on the resource that can be occupied by the received signal set to obtain control information from the wireless network device, the instructions further cause the apparatus to be configured to:
   receive the PCFICH in the signal set on a first time domain symbol of the resource that can be occupied by the received signal set; and
   receive the PDCCH in the signal set on the resource that can be occupied by the received signal set to obtain control information from a wireless network device, wherein a quantity of time domain symbols occupied by the PDCCH in the received signal set is a quantity of time domain symbols indicated by the PCFICH in the signal set.

8. The apparatus according to claim 5, wherein the instructions further cause the apparatus to be configured to calculate according to a size of a frequency sub-band and a total quantity of signal sets using a predefined resource allocation algorithm, the resource that can be occupied by the received signal set, wherein the frequency sub-band comprises subcarriers of one or more resource blocks (RBs) in the frequency domain, and wherein the size of the frequency sub-band and the total quantity of signal sets are obtained from a system broadcast message or a radio resource control (RRC) message from the wireless network device.

9. The method according to claim 1, wherein determining the resource that can be occupied by the received signal set comprises determining, by detecting the PCFICH in the received signal set from the wireless network device, the resource that can be occupied by the received signal set.

10. The method according to claim 1, wherein determining the resource that can be occupied by the received signal set comprises:
   detecting a cell-specific reference signal (CRS) from the wireless network device; and
   determining, according to a resource location of the CRS or a sequence of the CRS, the resource that can be occupied by the received signal set.

11. The method according to claim 1, wherein determining the resource that can be occupied by the received signal set comprises determining, by receiving a broadcast message or a radio resource control (RRC) message from the wireless network device, the resource that can be occupied by the received signal set.

12. The apparatus according to claim 5, wherein the instructions further cause the apparatus to be configured to:
   detect a cell-specific reference signal (CRS) from the wireless network device; and
   determine, according to a resource location of the CRS, the resource that can be occupied by the received signal set.

13. The apparatus according to claim 5, wherein the instructions further cause the apparatus to be configured to determine, by detecting the PCFICH in the received signal set from the wireless network device, the resource that can be occupied by the received signal set.

14. The apparatus according to claim 5, wherein the instructions further cause the apparatus to be configured to:
   detect a cell-specific reference signal (CRS) from the wireless network device; and
   determine, according to a sequence of the CRS, the resource that can be occupied by the received signal set.

15. The apparatus according to claim 5, wherein the instructions further cause the apparatus to be configured to determine, by receiving a broadcast message or a radio resource control (RRC) message from the wireless network device, the resource that can be occupied by the received signal set.

16. The apparatus according to claim 5, wherein the instructions further cause the apparatus to be configured to calculate according to a total quantity of frequency sub-bands and a total quantity of signal sets using a predefined resource allocation algorithm, the resource that can be occupied by the received signal set, wherein the frequency sub-band comprises subcarriers of one or more resource blocks (RBs) in the frequency domain, and wherein the total quantity of frequency sub-bands and the total quantity of signal sets are obtained from a system broadcast message or a radio resource control (RRC) message from the wireless network device.

17. The apparatus according to claim 6, wherein a quantity of time domain symbols occupied by the PDCCH in the received signal set is a quantity of time domain symbols occupied by the signal set and that is indicated in a system broadcast message.

18. The apparatus according to claim 6, wherein a quantity of time domain symbols occupied by the PDCCH in the received signal set is a preset quantity of time domain symbols.

19. A physical downlink control channel transmission method for use by a terminal to obtain control information from a wireless network device, wherein the control information comprises common control information and/or dedicated control information, the method comprising:
   determining a resource that can be occupied by a received signal set, wherein a signal in the received signal set comprises either a physical downlink control channel (PDCCH) or a PDCCH and a physical control format indicator channel (PCFICH), and wherein the resource that can be occupied by the signal set is lower than system bandwidth in a frequency domain;
   receiving the signal in the signal set on the resource that can be occupied by the received signal set to obtain the control information from the wireless network device; and
   processing the signal, wherein processing the signal comprises at least one of determining search space, de-interleaving, demodulating, or descrambling,
   wherein determining the resource that can be occupied by the received signal set comprises calculating, according to a size of a frequency sub-band and a total quantity of signal sets or according to a total quantity of frequency sub-bands and a total quantity of signal sets using a predefined resource allocation algorithm, the resource that can be occupied by the received signal set.

20. The method according to claim 19, wherein the frequency sub-band comprises subcarriers of one or more resource blocks (RBs) in the frequency domain, and wherein the size of the frequency sub-band and the total quantity of signal sets or the total quantity of frequency sub-bands and the total quantity of signal sets are obtained from a system broadcast message or a radio resource control (RRC) message from the wireless network device.

* * * * *

UNITED STATES PATENT AND TRADEMARK OFFICE
CERTIFICATE OF CORRECTION

PATENT NO. : 10,778,398 B2  
APPLICATION NO. : 15/922255  
DATED : September 15, 2020  
INVENTOR(S) : Ting Wang and Yuanjie Li Page 1 of 1

It is certified that error appears in the above-identified patent and that said Letters Patent is hereby corrected as shown below:

In the Claims

Claim 6, Column 39, Line 13: "from the network device," should read "from the wireless network device,"

Signed and Sealed this  
Twenty-seventh Day of October, 2020

Andrei Iancu  
*Director of the United States Patent and Trademark Office*